US008275755B2

(12) United States Patent
Hirsch et al.

(10) Patent No.: US 8,275,755 B2
(45) Date of Patent: *Sep. 25, 2012

(54) SYSTEMS AND METHODS FOR EFFICIENT DATA SEARCHING, STORAGE AND REDUCTION

(75) Inventors: Michael Hirsch, Mazkeret Batya (IL); Haim Bitner, Raanana (IL); Lior Aronovich, Ramat-Gan (IL); Ron Asher, Tel-Aviv (IL); Eitan Bachmat, Lehavim (IL); Shmuel T. Klein, Rehovot (IL)

(73) Assignee: International Business Machines Corporation, Armonk, NY (US)

( * ) Notice: Subject to any disclaimer, the term of this patent is extended or adjusted under 35 U.S.C. 154(b) by 321 days.

This patent is subject to a terminal disclaimer.

(21) Appl. No.: 12/407,765

(22) Filed: Mar. 19, 2009

(65) Prior Publication Data

US 2009/0234821 A1    Sep. 17, 2009

Related U.S. Application Data

(62) Division of application No. 10/941,632, filed on Sep. 15, 2004, now Pat. No. 7,523,098.

(51) Int. Cl.
   *G06F 7/00* (2006.01)
   *G06F 17/30* (2006.01)
   *G06F 17/00* (2006.01)
(52) U.S. Cl. ........ 707/687; 707/741; 707/755; 707/758; 711/216

(58) Field of Classification Search ........... 707/999.003, 707/999.006, 695, 696, 705, 609, 758, 769
See application file for complete search history.

(56) References Cited

U.S. PATENT DOCUMENTS

| 4,686,620 A | 8/1987 | Ng |
| 5,202,982 A | 4/1993 | Gramlich et al. |
| 5,446,888 A | 8/1995 | Pyne |
| 5,479,654 A | 12/1995 | Squibb |
| 5,559,991 A | 9/1996 | Kanfi |
| 5,574,906 A | 11/1996 | Norris |

(Continued)

FOREIGN PATENT DOCUMENTS

JP    5135108 A    6/1993

(Continued)

OTHER PUBLICATIONS

Schleimer, Saul et al. "Winnowing: Local Algorithms for Document Fingerprinting" Jun. 2003, pp. 76-85.*

(Continued)

*Primary Examiner* — Alicia Lewis
(74) *Attorney, Agent, or Firm* — Zilka-Kotab, PC

(57) ABSTRACT

Systems and methods enabling search of a repository for the location of data that is similar to input data, using a defined measure of similarity, in a time that is independent of the size of the repository and linear in a size of the input data, and a space that is proportional to a small fraction of the size of the repository. The similar data segments thus located are further analyzed to determine their common (identical) data sections, regardless of the order and position of the common data sections in the repository and input, and in a time that is linear in the segment size and in constant space.

19 Claims, 15 Drawing Sheets

U.S. PATENT DOCUMENTS

| | | | |
|---|---|---|---|
| 5,721,907 | A | 2/1998 | Pyne |
| 5,850,565 | A | 12/1998 | Wightman |
| 5,990,810 | A | 11/1999 | Williams |
| 6,038,665 | A * | 3/2000 | Bolt et al. ............... 713/176 |
| 6,049,804 | A | 4/2000 | Burgess et al. |
| 6,101,507 | A | 8/2000 | Cane et al. |
| 6,119,124 | A | 9/2000 | Broder et al. |
| 6,233,589 | B1 | 5/2001 | Balcha et al. |
| 6,349,296 | B1 | 2/2002 | Broder et al. |
| 6,366,986 | B1 | 4/2002 | St. Pierre et al. |
| 6,374,250 | B2 | 4/2002 | Ajtai et al. |
| 6,385,706 | B1 | 5/2002 | Ofek et al. |
| 6,393,438 | B1 | 5/2002 | Kathrow et al. |
| 6,397,308 | B1 | 5/2002 | Ofek et al. |
| 6,470,329 | B1 | 10/2002 | Livschitz |
| 6,487,561 | B1 | 11/2002 | Ofek et al. |
| 6,560,620 | B1 | 5/2003 | Ching |
| 6,604,236 | B1 | 8/2003 | Draper et al. |
| 6,658,423 | B1 | 12/2003 | Pugh et al. |
| 6,675,177 | B1 | 1/2004 | Webb |
| 6,694,337 | B1 | 2/2004 | King et al. |
| 6,704,730 | B2 | 3/2004 | Moulton et al. |
| 6,738,779 | B1 | 5/2004 | Shapira |
| 6,810,398 | B2 | 10/2004 | Moulton |
| 6,839,724 | B2 * | 1/2005 | Manchanda et al. ............ 707/625 |
| 6,920,537 | B2 | 7/2005 | Ofek et al. |
| 6,928,526 | B1 | 8/2005 | Zhu et al. |
| 6,947,933 | B2 | 9/2005 | Smolsky |
| 6,983,020 | B2 | 1/2006 | Christiansen |
| 7,055,008 | B2 | 5/2006 | Niles et al. |
| 7,065,619 | B1 | 6/2006 | Zhu et al. |
| 7,440,982 | B2 | 10/2008 | Lu et al. |
| 7,523,098 | B2 | 4/2009 | Hirsch et al. |
| 7,853,764 | B2 | 12/2010 | Bitner et al. |
| 2001/0034737 | A1 | 10/2001 | Cane et al. |
| 2001/0037323 | A1 | 11/2001 | Moulton et al. |
| 2002/0010702 | A1 * | 1/2002 | Ajtai et al. ............... 707/101 |
| 2002/0055932 | A1 | 5/2002 | Wheeler et al. |
| 2003/0061456 | A1 | 3/2003 | Ofek et al. |
| 2003/0120647 | A1 | 6/2003 | Aiken et al. |
| 2003/0167275 | A1 | 9/2003 | Rjaibi |
| 2003/0172066 | A1 * | 9/2003 | Cooper et al. ............... 707/7 |
| 2003/0179886 | A1 | 9/2003 | Yamada |
| 2003/0212717 | A1 | 11/2003 | Kashyap |
| 2003/0229617 | A1 | 12/2003 | Rjaibi et al. |
| 2004/0143713 | A1 | 7/2004 | Niles et al. |
| 2004/0153614 | A1 | 8/2004 | Bitner et al. |
| 2004/0172394 | A1 * | 9/2004 | Smolsky ............... 707/6 |
| 2004/0225643 | A1 | 11/2004 | Alpha et al. |
| 2004/0225655 | A1 | 11/2004 | Moulton |
| 2005/0004954 | A1 | 1/2005 | Soule, III |
| 2005/0165747 | A1 * | 7/2005 | Bargeron et al. ............ 707/3 |
| 2005/0204108 | A1 | 9/2005 | Ofek et al. |
| 2005/0262167 | A1 | 11/2005 | Teodosiu et al. |
| 2006/0059207 | A1 | 3/2006 | Hirsch et al. |
| 2006/0136750 | A1 | 6/2006 | Jakubowski et al. |
| 2007/0027937 | A1 | 2/2007 | McGrattan et al. |
| 2007/0214198 | A1 | 9/2007 | Fontenot et al. |
| 2008/0162478 | A1 * | 7/2008 | Pugh et al. ............... 707/6 |
| 2008/0319995 | A1 * | 12/2008 | Alspector et al. ............ 707/6 |
| 2009/0228453 | A1 | 9/2009 | Hirsch et al. |
| 2009/0228454 | A1 | 9/2009 | Hirsch et al. |
| 2009/0228455 | A1 | 9/2009 | Hirsch et al. |
| 2009/0228456 | A1 | 9/2009 | Hirsch et al. |
| 2009/0228534 | A1 | 9/2009 | Hirsch et al. |
| 2009/0234855 | A1 | 9/2009 | Hirsch et al. |
| 2010/0169329 | A1 | 7/2010 | Frieder et al. |
| 2010/0257378 | A1 | 10/2010 | Tan et al. |
| 2011/0055343 | A1 | 3/2011 | Gleeson et al. |

FOREIGN PATENT DOCUMENTS

| | | | |
|---|---|---|---|
| JP | 6103127 A | | 4/1994 |
| JP | 2003/524243 | | 8/2003 |
| JP | 2004/514968 | | 5/2004 |
| WO | 00/32049 | A1 | 6/2000 |
| WO | 01/61563 | A1 | 8/2001 |
| WO | 02/37689 | A1 | 5/2002 |
| WO | 2004/072961 | A2 | 8/2004 |

OTHER PUBLICATIONS

Broder et al. "Syntactic Clustering of the Web," SRC Technical Note 1997-015, Digital Equipment Corporation, Palo Alto, CA, Jul. 25, 1997.

Burns, R.C. "Differential Compression: A Generalized Solution for Binary Files," University of California, Santa Cruz, CA, Dec. 1996.

Karp et al. "Efficient randomized pattern-matching algorithms," IBM J. Res. Develop., 31(2), Mar. 1987.

Manber, U. "Finding Similar Files in a Large File System," University of Arizona, Tucson, AZ, Oct. 1993.

Navarro, G. "A guided Tour to Approximate String Matching," ACM Computing Surveys 33(1), 31-88, Mar. 2001, (abstract).

Reichenberger, C. "Delta Storage for Arbitrary Non-Text Files," Johannes Kepler University, Linz, Austria, ACM 089791-429,-5/91/0005/0144, 1991.

Rodeh, M. "Linear Algorithm for Data Compression via String Matching," J. of the Assoc. for Computing Machinery 28(1), 16-24, Jan. 1981.

Wagner, R.A. "The String-to-String Correction Problem," J. of the Assoc. for Computing Machinery 21(1) 168-173, Jan. 1974, (abstract).

Schleimer, Saul; Wilkerson, Daniel; Aiken, Alex; "Winnowing: Local Algorithms for Document Fingerprinting", pp. 76-85, SIGMOD 2003, Jun. 9-12, 2003, San Diego, CA, (abstract).

Tridgell, A.; "Efficient Algorithms for Sorting and Synchronization", The Australian National University, Feb. 1999.

Gilfillan, I. "Table Types in MySQL: Part 1—HEAP Tables" [online], [retrieved on Mar. 17, 2009]; Retrieved from the Internet: URL:http://www.databasejournal.com/features/mysql/.

International Search Report, PCT/US2005/033363, Feb. 21, 2006.

"How Rsync Works a Practical Overview" [online], [retrieved on Apr. 22, 2005] Retrieved from the Internet: URL:http://samba.anu.edu.au/rsync/how-rsync-works.html.

Tretau, et al "IBM Tivoli Storage Management Concepts" [online]. IBM Corp, 2003 [retrieved on Mar. 18, 2009]. Retrieved from the Internet: <URL: http://www.books24x7> Chapt 6.4.

European Communication from application No. 08153870.4 dated Aug. 4, 2009 (1 pg.).

European Communication from application No. 08153870.4 dated May 3, 2010 (5 pgs.).

European Communication from application No. 05797642.5 dated May 3, 2010 (4 pgs.).

Non-Final Office Action Summary from U.S. Appl. No. 11/194,086 dated Oct. 18, 2007.

Final Office Action Summary from U.S. Appl. No. 11/194,086 dated May 30, 2008.

Advisory Action Summary from U.S. Appl. No. 11/194,086 dated Nov. 10, 2008.

Non-Final Office Action Summary from U.S. Appl. No. 11/194,086 dated Feb. 18, 2009.

Otlu, "A New Technique: Replace Algorithm to Retrieve a Version From a Repository Instead of Delta Application," Apr. 2004, Thesis, MS, Middle East Tech. University, 83 pages, < retrieved from Examiner files Feb. 3, 2009>.

Hunt et al., "Delta Algorithms: An Empirical Analysis," Apr. 1988, ACM Trans. on Software Engineering and Methodology, p. 192-214, <Retrieved from Examiner files Feb. 3, 2009>.

Packetsoft, "RTPatch Professional Products," Nov. 12, 2001, 17 pages, < Retrieved from Examiner files Feb. 3, 2009>.

MacDonald, "File System Support for Delta Compression," Aug. 2000, University of California, Berkeley, 32 pages, < Retrieved from Examiner Files Feb. 3, 2009>.

Carol, "Laplink User Guide Version 11.0," Sep. 2001, p. 2-160, < Retrieved from Examiner Files Feb. 3, 2009>.

Final Office Action Summary from U.S. Appl. No. 11/194,086 dated Aug. 21, 2009.

Examiner's Answer from U.S. Appl. No. 11/194,086 dated Mar. 16, 2010.

Non-Final Office Action Summary from U.S. Appl. No. 10/941,632 dated Mar. 8, 2007.
Non-Final Office Action Summary from U.S. Appl. No. 10/941,632 dated Dec. 12, 2007.
Non-Final Office Action Summary from U.S. Appl. No. 10/941,632 dated Mar. 18, 2008.
Final Office Action Summary from U.S. Appl. No. 10/941,632 dated Oct. 28, 2008.
Notice of Allowance from U.S. Appl. No. 10/941,632 dated Dec. 10, 2008.
Non-Final Office Action Summary from U.S. Appl. No. 12/407,774 dated May 25, 2011.
Non-Final Office Action Summary from U.S. Appl. No. 12/407,782 dated Jul. 22, 2011.
Non-Final Office Action Summary from U.S. Appl. No. 12/407,786 date Jun. 9, 2011.
Non-Final Office Action Summary from U.S. Appl. No. 12/407,788 dated Jun. 23, 2011.
Non-Final Office Action Summary from U.S. Appl. No. 12/407,789 dated Jun. 8, 2011.
Notice of Acceptance from Australian application No. 2005284737 dated Feb. 23, 2011.
Knuth et al., "Fast Pattern Matching in Strings," SIAM Journal on Computer, vol. 6, pp. 323-350, 1977.
Boyer et al., "A Fast String Searching Algorithm," Communications of the ACM, vol. 20, pp. 762-772, 1977.
Weiner et al., "Linear Pattern Matching Algorithm," Proceedings of the 14th IEEE Symposium on Switching and Automata Theory, pp. 1-11, 1973.
Ukkonen, "On-Line Construction of Suffix Trees," Algorithmica, vol. 14, No. 3, pp. 249-260, 1995.
Fischer et al., "String Matching and Other Products, in Complexity of Computation," SIAM-AMS Proceedings, vol. 7, pp. 113-125, 1974.
Landau et al., "Fast Parallel and Serial Approximate String Matching," Journal of Algorithms, vol. 10, No. 2, pp. 157-169, 1989.
Amir et al., "Faster Algorithms for String Matching with k Mismatches," Journal of Algorithms, vol. 50, No. 2, pp. 257-275, 2004.
Non-Final Office Action Summary from U.S. Appl. No. 12/407,779 mailed Aug. 26, 2011.
Final Office Action Summary from U.S. Appl. No. 12/407,786 dated Nov. 25, 2011.
Final Office Action Summary from U.S. Appl. No. 12/407,789 dated Nov. 25, 2011.
Final Office Action Summary from U.S. Appl. No. 12/407,774 dated Nov. 8, 2011.
Final Office Action Summary from U.S. Appl. No. 12/407,779 dated Jan. 24, 2012.
Final Office Action Summary from U.S. Appl. No. 12/407,782 dated Jan. 5, 2012.
Final Office Action Summary from U.S. Appl. No. 12/407,788 dated Feb. 1, 2012.
Notice of Allowance and Fee(s) Due from U.S. Appl. No. 12/407,786 dated May 15, 2012.
Notice of Allowance and Fee(s) Due from U.S. Appl. No. 12/407,788 dated May 16, 2012.
Final Office Action Summary from U.S. Appl. No. 12/407,774 mailed Jun. 14, 2012.

* cited by examiner

SYSTEMS AND METHODS FOR EFFICIENT DATA SEARCHING, STORAGE AND REDUCTION

CROSS REFERENCE TO RELATED APPLICATION

The present Application is a Divisional of copending parent application Ser. No. 10/941,632, filed 09/15/2004.

FIELD OF THE INVENTION

This invention relates to systems and methods for searching of and storage of data; these systems and methods are particularly useful for generating and maintaining a large scale data repository in backup and restore systems.

BACKGROUND INFORMATION

Storing large amounts of data efficiently, in terms of both time and space, is of paramount concern in the design of a backup and restore system, particularly where a large repository of digital data must be preserved. For example, a user or group of users might wish to periodically (e.g., daily or weekly) backup all of the data stored on their computer(s) as a precaution against possible crashes, corruption or accidental deletion of important data. It commonly occurs that most of the data, at times more than 99%, has not been changed since the last backup has been performed, and therefore much of the current data can already be found in the repository, with only minor changes. If this data in the repository that is similar to the current backup data can be located efficiently, then there is no need to store the data again, rather, only the changes need be recorded. This process of storing common data once only is known as data factoring.

A large-scale backup and restore system that implements factoring may have one petabyte (PB) or more in its repository. For example, banks that record transactions performed by customers, or internet service providers that store email for multiple users, typically have a repository size ranging from hundreds of gigabytes to multiple petabytes. It may be recalled that 1 PB=1024 TB (terabyte), 1 TB=1024 GB (gigabyte), 1 GB=1024 MB (megabyte), 1 MB=1024 KB (kilobyte), 1 KB=1024 bytes. In other words, a petabyte (PB) is $2^{50}$ bytes, or about $10^{15}$ bytes.

In such systems, the input (backup) data stream to be added to the repository may be, for instance, up to 100 GB or more. It is very likely that this input data is similar to data already in the repository, but not exactly the same, and/or it may not be arranged on the same data boundaries (e.g., block alignment). In order to make a subsequent factoring step efficient, the backup and restore system must be able to efficiently find the location of the data in the repository that is sufficiently similar to the input stream without relying on any relative alignment of the data in the repository and the data in the input stream. It must also be able to efficiently add the input stream to the repository and remove from the repository old input streams that have been deleted or superseded.

Generally, it can be assumed that data changes are local. Thus, for instance, if 1% of the data has been changed, then such changes are concentrated in localized areas and in those areas there are possibly major changes, while the vast majority of the data areas have remained the same. Typically (although not necessarily) if 1% of the data has changed, then viewing the data as a stream of 512-byte blocks rather than as a stream of bytes, a little more than 1% of the blocks have changed. However, because there is no predetermined alignment of the data in the input stream and repository, finding the localized data changes is a significant task.

Searching for similar data may be considered an extension of the classical problem of pattern matching, in which a text T of length n is searched for the appearance of a string P of length m. Typically, n is much larger than m. Many publications present search methods which attempt to solve this problem efficiently, that is, faster than the naïve approach of testing each location in T to determine if P appears there. By preprocessing the pattern, some algorithms achieve better complexity, for example see:

Knuth D. E., Morris J. H., Pratt V. R., Fast pattern matching in strings, *SIAM Journal on Computing* 6 (1977) 323-350.
  Boyer R. S., Moore J. S., A fast string searching algorithm, *Communications of the ACM* 20 (1977) 762-772.
  Karp R., Rabin M., Efficient randomized pattern matching algorithms, *IBM Journal of Research and Development* 31 (1987) 249-260.

All of these algorithms work in time that is of order O(n+m), which means that the search time grows linearly with the text. One problem with these algorithms is that they are not scalable beyond some restrictive limit. For example, if searching a 1 GB text (the size of about 300 copies of the King James Bible) can be done in 1 second, searching a one Petabyte text would require more than 12 days of CPU time. A backup and restore system with one Petabyte (PB) or more in its repository could not use such an algorithm. Another disadvantage of the above algorithms is that they announce only exact matches, and are not easily extended to perform approximate matching.

Instead of preprocessing the pattern, one may preprocess the text itself, building a data structure known as a suffix tree; this is described in the following publications:

Weiner P., Linear pattern matching algorithm, *Proceedings of the 14th IEEE Symposium on Switching and Automata Theory*, (1973) 1-11.
  Ukkonen E., On-line construction of suffix trees, *Algorithmica* 14(3) (1995) 249-260.

If preprocessing is done off-line, then the preprocessing time may not be problematic. Subsequent searches can be then performed, using a suffix tree, in time O(m) only (i.e., depending only on the pattern size, not on the text size). But again, only exact matches can be found; moreover, the size of the suffix tree, though linear in the size of the text, may be prohibitive, as it may be up to 6 times larger than the original text.

For backup and restore, it would be desirable to use an algorithm for approximate pattern matching because it will usually be the case that not an exact replica of the input data can be found in the repository, but rather a copy that is strictly speaking different, but nevertheless very similar, according to some defined similarity criterion. Approximate pattern matching has been extensively studied, as described in:

Fischer M. J., Paterson M. S., String matching and other products, in *Complexity of Computation*, R. M. Karp (editor), *SIAM-AMS Proceedings* 7 (1974) 113-125.
  Landau G. M., Vishkin U., Fast parallel and serial approximate string matching, *Journal of Algorithms* 10(2) (1989) 157-169.
  Navarro G., A Guided Tour to Approximate String Matching, *ACM Computing Surveys*, 33(1) (2001) 31-88.

One recent algorithm works in time $O(n\sqrt{k\log k})$, where n is the size of the text and k is the number of allowed mismatches between the pattern and the text; see for example:

Amir A., Lewenstein M., Porat E., Faster algorithms for string matching with k mismatches, *Journal of Algorithms* 50(2) (2004) 257-275.

For large-scale data repositories, however, $O(n\sqrt{k}\log k)$ is not an acceptable complexity. An input data stream entering the backup and restore system may be, for instance, of length up to 100 GB or more. If one assumes that an almost identical copy of this input stream exists in the repository, with only 1% of the data changed, there are still about 1 GB of differences, that is $k=2^{30}$ bytes. To find the locations of approximate matches in the repository, this algorithm will consume time proportional to about 180,000 times the size of the text n. This is unacceptable where our premise is n alone is so large, that an algorithm scanning the text only once, may be too slow.

Another family of algorithms is based on hashing functions. These are known in the storage industry as CAS (Content Addressed Storage), as described in:

Moulton G. H., Whitehill S. B., Hash file system and method for use in a commonality factoring system, U.S. Pat. No. 6,704,730.

The general paradigm is as follows: The repository data is broken into blocks, and a hash value, also called a fingerprint or a signature, is produced for each block; all of these hash values are stored in an index. To locate some given input data, called the version, it is also broken into blocks and the same hash function (that has been applied to the repository blocks) is applied to each of the version blocks. If the hash value of a version block is found in the index, a match is announced.

The advantage of CAS over the previous methods is that the search for similar data is now performed on the index, rather than on the repository text itself, and if the index is stored using an appropriate data structure, the search time may be significantly reduced. For instance, if the index is stored as a binary tree or a more general B-tree, the search time will only be $O(\log(n/s))$, where n is the size of the text, and s is the size of the blocks. If the index is stored in a sorted list, an interpolation search of the sorted list has an expected time of $O(\log \log(n/s))$. If the index is stored in a hash table, the expected time could even be reduced to $O(1)$, meaning that searching the index could be done in constant expected time, in particular in time independent of the size of the repository text.

There are, however, disadvantages to this scheme. As before, only exact matches are found, that is, only if a block of input is identical to a block of repository will a match be announced. One of the requirements of a good hash function is that when two blocks are different, even only slightly, the corresponding hash values should be completely different, which is required to assure a good distribution of the hash values. But in backup and restore applications, this means that if two blocks are only approximately equal, a hashing scheme will not detect their proximity. Searching in the vicinity of the found hash value will also not reveal approximate matches. Moreover, an announced match does not necessarily correspond to a real match between two blocks: a hash function h is generally not one-to-one, so one can usually find blocks X and Y such that $X \neq Y$ and $h(X)=h(Y)$.

These problems create a dilemma of how to choose the size s of the blocks: if a large block size is chosen, one achieves a smaller index (since the index needs to store n/s elements) and the probability of a false match is reduced, but at the same time, the probability of finding a matching block is reduced, which ultimately reduces the compression ratio (assuming the hashing function is used in a compression method, which stores only non-matching blocks, and pointers to the matching ones). If, on the other hand, a small block size is chosen, the overall compression efficiency may increase, but the probability of a false match also increases, and the increased number of blocks may require an index so large that the index itself becomes a storage problem.

In summary, many elegant methods have been suggested to address these problems, but they all ultimately suffer from being not scalable, in reasonable time and space, to the amount of data in a large sized data repository.

SUMMARY OF THE INVENTION

The present invention is directed to systems and methods for efficient data searching, storage and/or reduction.

Systems and methods consistent with one embodiment of the invention can search a repository of binary uninterpreted data for the location of data that is similar to an input data, using a defined measure of similarity, and can do so in time that is independent of the size of the repository and linear in the size of the input data, and in space that is proportional to a small fraction of the size of the repository.

Systems and methods consistent with other embodiments of the invention can further analyze the similar data segments of the repository and input data and efficiently determine their common (identical) sections, regardless of the order and position of the common data in the repository and input, and do so in time that is linear in the segments' size and in constant space.

In one embodiment, a method is provided for identifying input data in repository data comprising:

providing an index of repository data, including at least N distinguishing characteristics for each of a plurality of chunks of the repository data;

partitioning the input data into a plurality of input chunks;

for each input chunk, determining at least K distinguishing characteristics and searching the index for each of the K distinguishing characteristics until at least J matches with the repository distinguishing characteristics are found, and if J matches are found for an input chunk and a respective repository chunk, the respective repository chunk being determined to be a similar repository chunk where $J \leq N \leq K$; and computing at least one of common and noncommon sections of the input chunk and similar repository chunk using the matching distinguishing characteristics as anchors to define corresponding intervals in the input chunk and similar repository chunk. A method for identifying common sections of two data intervals comprising:

determining anchors that define corresponding intervals in the two data intervals which are likely to contain matching data, each anchor comprising a pair of matching seeds in the two data intervals; and comparing the data between and in the vicinity of the anchors in the corresponding intervals to find matching data intervals.

In one embodiment, a method is provided for identifying common sections of two data intervals comprising:

determining anchors that define corresponding intervals in the two data intervals which are likely to contain matching data, each anchor comprising a pair of matching seeds in the two data intervals; and comparing the data between and in the vicinity of the anchors in the corresponding intervals to find matching data intervals.

In one embodiment, a system is provided for identifying input data in repository data comprising:

means for providing an index of repository data, including at least N distinguishing characteristics for each of a plurality of chunks of the repository data;

means for partitioning the input data into a plurality of input chunks;

means for determining at least K distinguishing characteristics for each input chunk and searching the index for each of the K distinguishing characteristics until at least J matches with the repository distinguishing characteristics are found, and if J matches are found for an input chunk and a respective repository chunk, the respective repository chunk being determined to be a similar repository chunk where $J \leq N \leq K$; and means for computing at least one of common and noncommon sections of the input chunk and similar repository chunk using the matching distinguishing characteristics as anchors to define corresponding intervals in the input chunk and similar repository chunk.

In one embodiment, a system is provided for identifying input data in repository data comprising:

a processor; and a memory, wherein the processor and memory are configured to perform a method comprising:

providing an index of repository data, including at least N distinguishing characteristics for each of a plurality of chunks of the repository data;

partitioning the input data into a plurality of input chunks;

for each input chunk, determining at least K distinguishing characteristics and searching the index for each of the K distinguishing characteristics until at least J matches with the repository distinguishing characteristics are found, and if J matches are found for an input chunk and a respective repository chunk, the respective repository chunk being determined to be a similar repository chunk where $J \leq N \leq K$; and computing at least one of common and noncommon sections of the input chunk and similar repository chunk using the matching distinguishing characteristics as anchors to define corresponding intervals in the input chunk and similar repository chunk.

In one embodiment, a computer-readable medium is provided containing instructions to configure a data processor to perform a method for identifying input data in repository data, the method comprising:

providing an index of repository data, including at least N distinguishing characteristics for each of a plurality of chunks of the repository data;

partitioning the input data into a plurality of input chunks;

for each input chunk, determining at least K distinguishing characteristics and searching the index for each of the K distinguishing characteristics until at least J matches with the repository distinguishing characteristics are found, and if J matches are found for an input chunk and a respective repository chunk, the respective repository chunk being determined to be a similar repository chunk where $J \leq N \leq K$; and computing at least one of common and noncommon sections of the input chunk and similar repository chunk using the matching distinguishing characteristics as anchors to define corresponding intervals in the input chunk and similar repository chunk.

In one embodiment, a system is provided for identifying input data in repository data, the system comprising at least one memory comprising:

code that provides an index of repository data, including at least N distinguishing characteristics for each of a plurality of chunks of the repository data;

code that partitions the input data into a plurality of input chunks;

code that determines at least K distinguishing characteristics for each input chunk and searches the index for each of the K distinguishing characteristics until at least J matches with the repository distinguishing characteristics are found, and if J matches are found for an input chunk and a respective repository chunk, the respective repository chunk being determined to be a similar repository chunk where $J \leq N \leq K$; and code that computes at least one of common and noncommon sections of the input chunk and similar repository chunk using the matching distinguishing characteristics as anchors to define corresponding intervals in the input chunk and similar repository chunk.

In one embodiment, a computer readable media is provided for identifying input data in repository data, the computer readable media comprising code, the code comprising:

code that provides an index of repository data, including at least N distinguishing characteristics for each of a plurality of chunks of the repository data;

code that partitions the input data into a plurality of input chunks;

code that determines at least K distinguishing characteristics for each input chunk and searches the index for each of the K distinguishing characteristics until at least J matches with the repository distinguishing characteristics are found, and if J matches are found for an input chunk and a respective repository chunk, the respective repository chunk being determined to be a similar repository chunk where $J \leq N \leq K$; and code that computes at least one of common and noncommon sections of the input chunk and similar repository chunk using the matching distinguishing characteristics as anchors to define corresponding intervals in the input chunk and similar repository chunk.

In one embodiment, a method is provided enabling lossless data reduction by partitioning version data into:

a) data already stored in a repository; and b) data not already stored in the repository;

wherein, each of the repository data and the version data comprise a plurality of data chunks, and wherein the method comprises, for each version chunk:

determining whether a similar repository chunk exists based on a plurality of matching distinguishing characteristics in the version chunk and similar repository chunk; and determining differences between the version chunk and similar repository chunk by comparing the full data of the respective chunks.

In one embodiment, a method is provided of locating matching data in a repository to input data comprising:

applying a hash-based function to determine, for each of a plurality of chunks of the input data, a set of representation values for each input chunk;

selecting a subset of the set of representation values to determine a set of distinguishing characteristics for each input chunk;

using the set of input distinguishing characteristics to locate a chunk of the repository data deemed likely to contain matching data;

using the input representation values to identify matching data in the repository chunk.

In one embodiment, a method is provided of searching a repository of binary uninterpreted data for a location of common data to an input data comprising:

analyzing segments of each of the repository and input data to determine a repository segment that is similar to an input segment, the analyzing step including searching an index of representation values of the repository data for matching representation values of the input in a time independent of a size of the repository and linear in a size of the input data; and analyzing the similar repository segment with respect to the input segment to determine their common data sections while utilizing at least some of the matching representation values for data alignment, in a time linear in a size of the input segment.

In one embodiment, a method is provided of indexing repository data comprising:

generating distinguishing characteristics of input data;

using the input data distinguishing characteristics for locating a similar data segment in the repository data;

using the input data distinguishing characteristics for locating common data sections in the similar repository data segment;

storing in the index at least some of the distinguishing characteristics of the input data; and storing at least some noncommon data sections of the input data in the repository data.

In one embodiment, a method is provided comprising:

computing data characteristics for incoming data; and searching for elements of the incoming data characteristics within an index of repository data characteristics and declaring a similarity match between a portion of a repository and a portion of the new data if the matched characteristics pass a threshold.

In one embodiment, a method is provided for searching in repository data for parts that are sufficiently similar to an input data according to a similarity criterion, comprising:

processing the repository data by a. dividing the repository data into parts called repository chunks;

b. for each of the repository chunks, calculating one or a plurality of repository distinguishing characteristics (RDCs), each RDC belonging an interval of integers called value range;

c. creating pairs associating each RDC with a corresponding repository chunk; and d. maintaining an index storing the pairs;

processing the input data by a. dividing the input data into parts called input chunks; and b. performing for each of the input chunks:

i. calculating one or a plurality of input distinguishing characteristics (IDCs);

ii. searching for the IDCs in the pairs stored in the index; and iii. if a threshold j of the IDCs has been found in the pairs stored in the index, declaring a match between the input chunk and the corresponding repository chunk(s) that are associated with the IDCs in the pairs.

According to such method, the RDCs are obtained by:

partitioning the repository chunk into smaller parts called seeds;

applying a hash function to each of the seeds, yielding one hash value for each of the seeds;

selecting a subset of the hash values of the seeds;

using the pairs in the index, identifying indices of seeds, called indices, corresponding to the hash in the subset;

applying a relocation function to the indices to determine relocated indices; and defining the RDCs as the hash values of the seeds at the relocated indices.

According to such method, the method is used for lossless data reduction comprising:

processing the data to find similar data in the repository;

comparing the input chunk to the similar repository data, and identifying as common factors variable size ranges of data in the input chunk that match exactly ranges in the similar repository data; and saving the data such that:

a. the common factors are saved only once, and saving a data directory that shows a plurality of positions within the data where the common factors belong; and b. saving in full the data ranges not included in the common factors.

According to such method, the method is used for space-saving data backup and data restore by saving data in a data repository, and restoring data from the data repository. In one embodiment, the lossless data reduction is done online, as received by the repository, and substantially in the order of receipt by the repository. In one embodiment, the lossless data reduction is done offline comprising:

saving the data in the data repository without processing;

marking or keeping a list of the not processed data;

processing the data, as described above, to achieve the lossless data reduction, according to:

a. any predetermined schedule and order and/or b. when a repository management system designates a time to process the data based on one or more of:

i. how busy is the system;

ii. how much the data to be processed is accessed;

iii. how much space is predicted for the data by applying the lossless data reduction; and iv. the used capacity of the repository and the unused capacity of the repository.

Additional objects and advantages of various embodiments of the invention are set forth in the description which follows, and will be obvious from the description, or may be learned by practice of the invention. The advantages of various embodiments of the invention may be realized by the elements and combinations of the appended claims.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, serve to explain certain principles of the invention. In the drawings.

DETAILED DESCRIPTION

As used in the following embodiments, a repository is a collection of digital data stored in memory and/or storage of a computer reference; there is no limit on its size and the repository can be of the order of one or more PB. In particular applications, the data is stored as binary uninterpretted data. The input data can be of the same type or different from the repository data; the input data is also called the version. In particular applications, the version and repository are broken into chunks. The chunk size m is a parameter, e.g. 32 MB. The term seed refers to a consecutive sequence of data elements, such as bytes. The seed size s is also a parameter, e.g. 512 bytes, or (in other non-limiting examples) 4 KB or even 8 KB. Generally, the seed size s is much smaller than the chunk size m.

In accordance with certain embodiments of the invention a hash function is used. A hash function maps elements of some large space into elements of some smaller space by assigning elements of the first space a numeric value called the hash value. The hash function is usually an arithmetic function that uses as input some numeric interpretation of the base elements in the first space. A "good" hash function will most of the time produce a statistically unrelated hash value for even the slightest change in the elements of the first space. In the following embodiments a modular hash function is used. This, however, is a non-limiting example. As is well known, a modular hash function has the property that if the hash value of s consecutive base elements in some stream is known, then the hash value of the s base elements in the stream that start one base element later (and are thus overlapping with the previous sequence of base elements) can be calculated in $O(1)$ operations. In this way, all the hash values of all the seeds in a chunk can be calculated in $O(m)$ operations rather than in $O(m*s)$. Because of this property, this hash function is called a rolling hash function. Note that the invention is not bound by the use of rolling hash functions in particular or hash functions in general.

An index is a data structure that facilitates efficient searching. It should be space efficient. For some applications (such as the current embodiment) it should support efficient dynamic operations, such as insertion and deletion. An index may be implemented by a hash table, so that searching, insertion and deletion are supported in $O(1)$ operations each. In accordance with certain embodiments of the invention described below, the index is indexed by a key, which is a hash value of some seed, and each key value identifies the seed (or seeds) that it was generated from.

Figure 1:
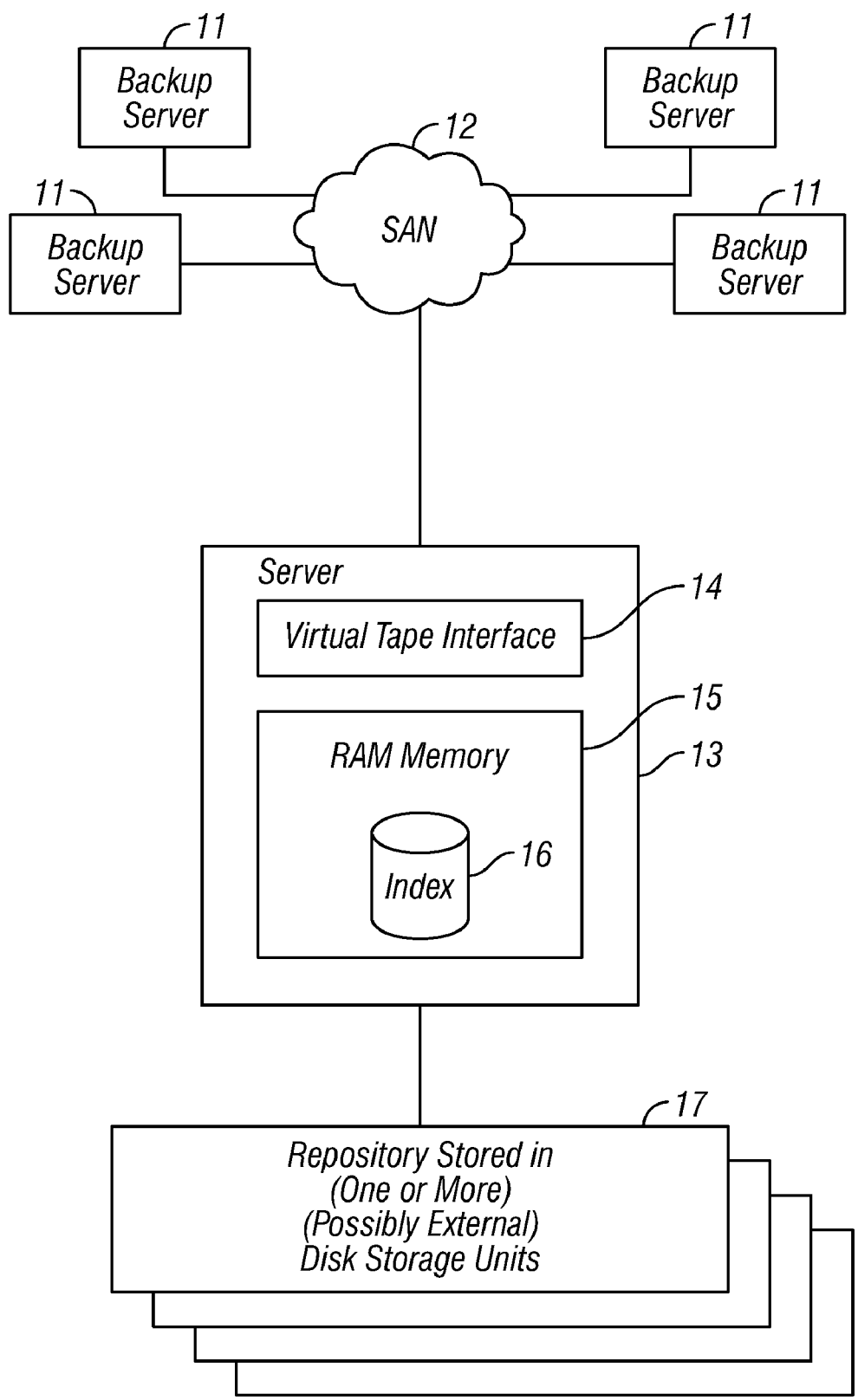
FIG. 1 illustrates a general system architecture of an exemplary backup and restore system, which may be useful in certain described embodiments of the invention.

In FIG. 1 there is shown a generalized storage system architecture in accordance with an embodiment of the invention. The invention is of course, not bound by this specific system architecture. In FIG. 1, a storage area network SAN (12) connects four backup servers (11) to server (13). Server (13) includes a virtual tape interface (14) and RAM memory (15); an index (16) is stored in RAM (15). The server (13) is connected to a repository (17) which is stored in one or more (possibly external) secondary storage units.

Figure 2:
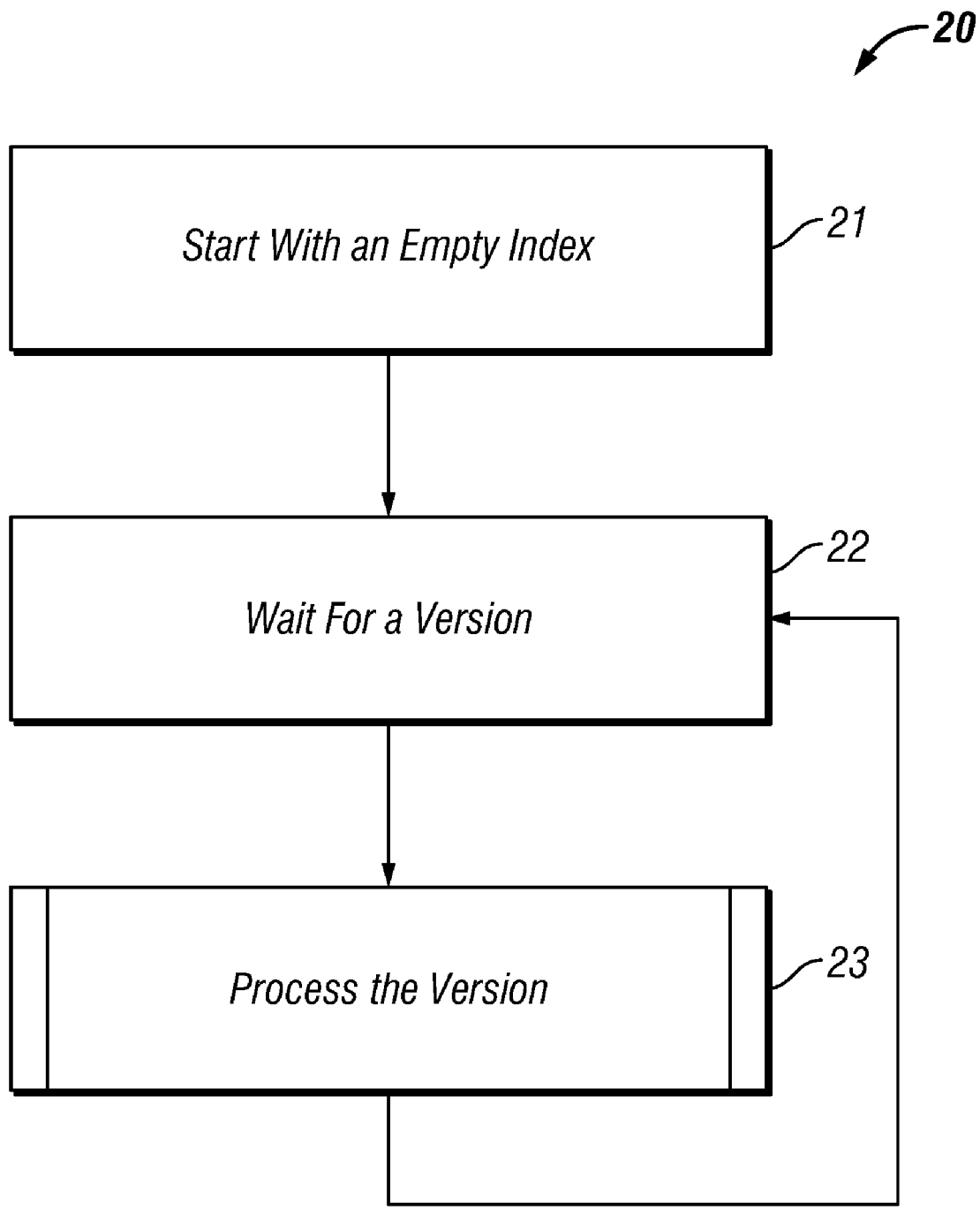
FIG. 2 is a flowchart showing exemplary steps for processing an input version data stream in accordance with an embodiment of the invention.

In FIG. 2 a flow chart (20) illustrates the steps of a system life cycle in accordance with an embodiment of the invention. As is shown, the process starts with an empty Index (21). The content and purpose of the index is detailed below. Next the system enters a wait state until a version (22) is received, and thereafter the version is processed (23) in a manner described in greater detail below. After processing the version, the system returns to wait state (22) until another version is received. The sequence (22, 23) proceeds as long as more input versions are received. The input version may or may not update the repository and/or the index. In one factoring application described herein, if an input version is recognized as a new one (not sufficiently similar to data in the repository) it is incorporated into the repository as is. If, on the other hand, the input version is recognized as sufficiently similar to already existing data in the repository, it is factored with the repository data, and only the unmatched parts of the version are stored. As is apparent from the foregoing, the longer the system operates the larger the size of the repository. In certain applications, the repository size ranges from hundreds of gigabytes to multiple petabytes. It is thus necessary to locate the repository data that is sufficiently similar to the input data in an efficient manner; otherwise, the processing time will be too long and the system not economically or commercially feasible.

Figure 3:
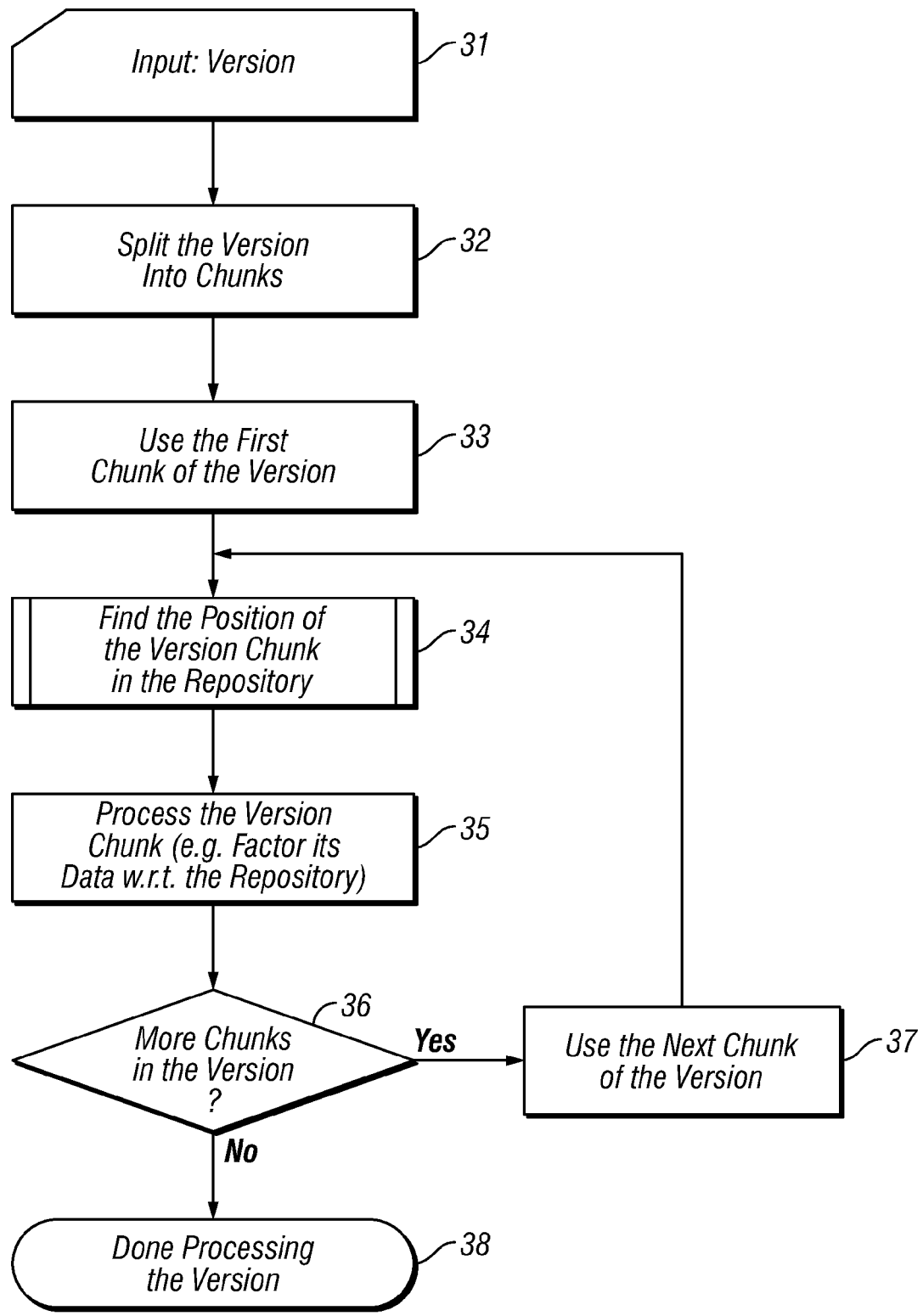
FIG. 3 is a more detailed sequence of steps for processing data chunks of an input version stream, according to one embodiment.

FIG. 3 details one method of processing a version (step 23 in FIG. 2) in accordance with an embodiment of the invention. When a version is received (31) it is divided into smaller chunks (32), say 32 MB per chunk. The first input chunk is selected (33); the input chunk is processed to find a sufficiently similar chunk in the repository and its position (34). This step (34) is described with repository to FIG. 4 in greater detail below. Having found a similar repository chunk, the version chunk is further processed (35), which, according to this embodiment, entails factoring the version chunk with the repository. This process is repeated for additional chunks of the input version (34 to 37), until there are no more chunks in the version and processing is done (38). In accordance with a different embodiment of the invention, given that an input chunk is matched with certain repository data, the following input chunk is first tested to match the repository data succeeding the matched repository chunk, thus proceeding directly to its application specific processing (35). If, on the other hand, the following input chunk fails this test, it is fully processed to find its similar repository data (34, 35).

Synchronization Algorithm and Factoring

Figure 4:
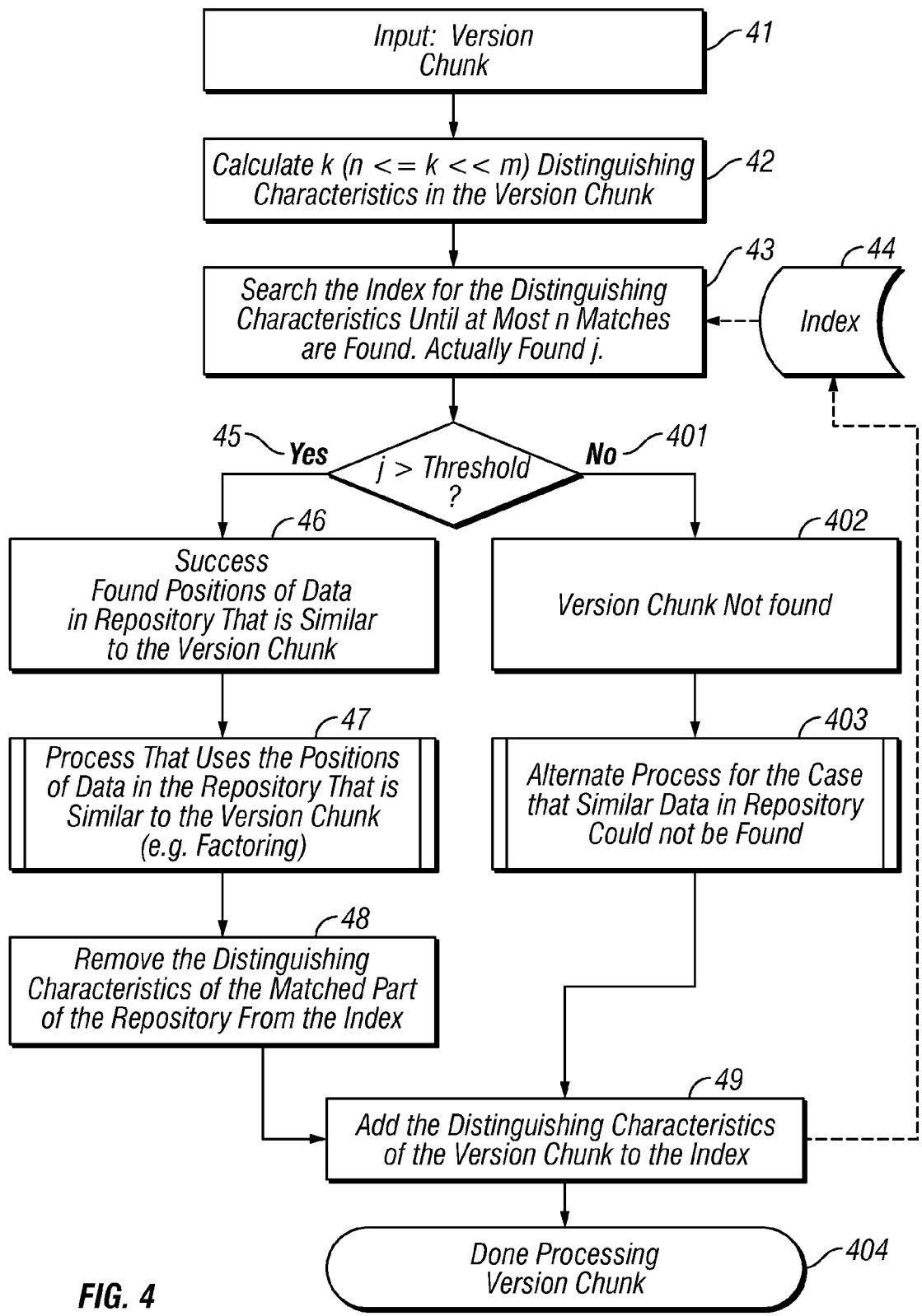
FIG. 4 is a more detailed a sequence of steps for finding a position of a version chunk in a repository, according to one embodiment.

FIG. 4 illustrates one sequence of steps for efficiently finding a position of a sufficiently similar chunk in the repository (step 34 of FIG. 3), and subsequent factoring steps, in accordance with an embodiment of the invention. The algorithm used to find the similar repository chunk to the input (version) chunk is referred to herein as a synchronization algorithm, because its output includes common points in the repository and version, which are useful in later processing for effectively aligning (on the same data boundaries) what was previously two unaligned data segments.

An input chunk of size m, say 32 MB, is processed (41) in the following manner. First, k distinguishing characteristics in the version chunk (42) are calculated, where k is a parameter of this algorithm as explained below (typically of the order of a few tens), and where k<<m. In accordance with one embodiment (and as will be further described below with respect to a specific example), the k distinguishing characteristics can be calculated as follows (not shown in FIG. 4);

(1) Calculate a hash value for every seed of the input data chunk. The seeds can be of any size s substantially smaller than m, say 4 KB. By this non-limiting embodiment, the hash value for every seed is calculated using a rolling hash function which moves in each iteration by one byteforward. A hash value is calculated in each iteration with respect to the 4 KB seed size accommodated within this range. By this example, where the input chunk size m=32 MB and seed size s=4 KB, there are 33,550,337 (32 MB–4 KB+1) hash values obtained for each chunk, one at every possible byte offset in the chunk. With probability practically 1, the hash values for different seeds (containing different data) will all be different. A rolling hash function has the advantage that once the hash value for a seed of s bytes is known, calculating the hash function for the next s bytes (i.e. s bytes shifted by one byte with respect to the previous s bytes and thus having s–1 overlapping bytes) can be done in O(1) operations, rather than O(s). Note that the invention is not bound by the use of hash functions, nor by hash functions of the rolling type.

(2) Next, the k maximum hash values, in descending order, of respective k seeds, are selected from among the (33,550,337) calculated hash values; these k seeds constitute the k maximum seeds. Thereafter, the k hash values of respective k seeds that follow by one byte (and overlap by s–1 bytes) the k maximum seeds, respectively, are selected; these k seeds constitute the k distinguishing seeds and their corresponding hash values constitute the k input distinguishing characteristics. Note that the maximum values themselves, have a probabilistic distribution that is not uniform. However, if a good hash function is used, the probabilistic distribution of the following k values will be very close to uniform and therefore better for the intended application. By uniform distribution it is meant that the k distinguishing characteristics are substantially uniformly distributed as numbers on some range of numbers.

Note that the invention is not bound by calculating the distinguishing characteristics in the manner described above. Any selection that yields, to a high extent, unique, robust, and well spread characteristics, and is repeatable for a given chunk, can be used in this embodiment of the invention. Unique means that two different chunks will be assigned, with sufficiently high probability, two different sets of characteristics. Robust means that the characteristics assigned to a chunk will remain fairly constant given that the chunk undergoes modest changes (e.g., in up to 25% of its seeds). Well spread means that the characteristic locations are well spread (substantially uniformly) over the chunk (geographically spread). Repeatable means that a certain form of a chunk will substantially always be assigned the same characteristics. Such methods may consider only a subset of the chunk's seeds. For instance, the selection of characteristics can be at intervals in the chunk the distance between which is defined by an arithmetic or geometric sequence, in accordance with a certain embodiment. Other methods consider all of the chunk's seeds, such as the foregoing method described. In accordance with this embodiment, a minimum geographic (positional) spread between the characteristics can be enforced, thus improving coverage. In general, any repeatable selection based on mathematical characteristics of the calculated seed values is applicable. For example, one may choose the k minimal hash values, or the k hash values closest to the median of all the hash values calculated in the chunk, or even the k hash values closest to some predetermined constant. Another example is choosing the k characteristics as the sum of pairs, such that the first pair consists of the minimal value and the maximal value, the second pair consists of the second minimal value and the second maximal value, etc. Other variants are applicable, depending upon the particular application.

Also, instead of using a one byte shift of the seed corresponding to a maximal value, one could use some other predetermined constant shift, or even different shifts depending on the position and/or on the calculated hash value. The example of using maximum hash values and one byte shifts is thus only one possible embodiment.

A specific example of this one procedure for calculating the distinguishing characteristics is given below.

In this embodiment, the repository is associated with an index which stores, in respect of each repository chunk, n distinguishing characteristics where n<=k. The n distinguishing characteristics are n hash values of the seeds of size s bytes that follow by one byte (and overlap by s–1 bytes), respectively, the seeds having the n maximum hash values from among the seeds in the repository chunk. The reason why k distinguishing characteristics are calculated for each input chunk, but the index contains only n distinguishing characteristics, for each repository chunk is explained below. The index further stores the position in the repository of each distinguishing characteristic. The invention is not bound by the specific index structure and contents described above.

Figure 5:
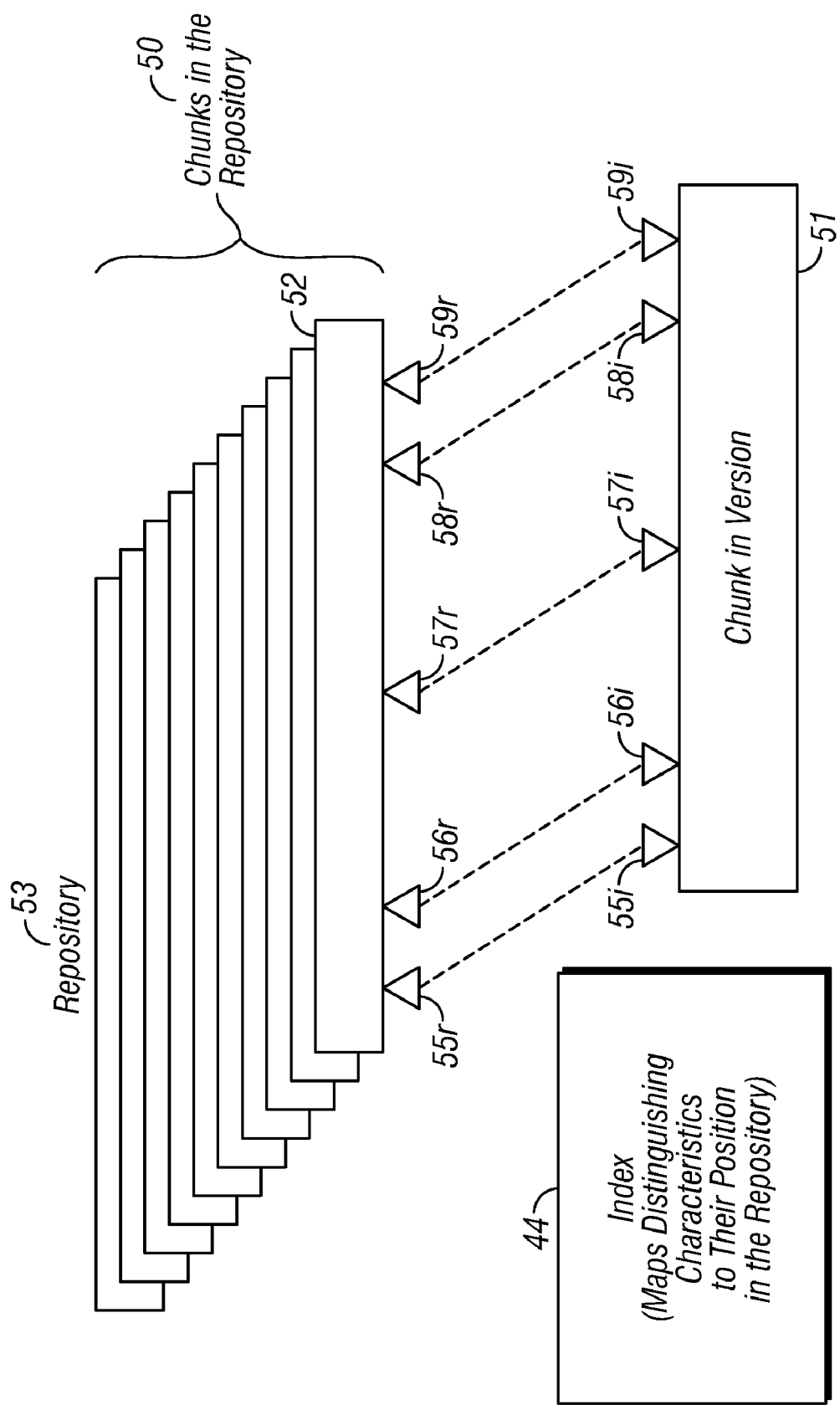
FIG. 5 illustrates schematically a correspondence between seeds in a version chunk and seeds in a repository chunk, according to one embodiment.

For a better understanding of an index structure, FIG. 5 illustrates graphically an index (44) and the correspondence between a set (e.g., five) of distinguishing characteristics 55i-59i in an input chunk 51 and a corresponding set (five) of distinguishing characteristics 55r-59r in a substantially similar repository chunk 52, in accordance with an embodiment of the invention. The repository chunk forms part of a repository 53, which here stores a huge number of chunks 50. The distinguishing characteristics are, as previously described, a selected set of hash values generated from well-spread seeds that are indicated by the five triangles 55i to 59i in the input chunk (51). The same five distinguishing characteristics 55r to 59r are shown in the substantially similar repository chunk 52. The index (44) holds the distinguishing characteristics of the repository chunks (including the five of chunk (52)) and associated position data, (e.g. the relative location of the chunk (52) in the repository). Thus, during a similarity search, when the values of a repository chunk (52) are found as matching those of an input chunk (51), the location of the sought chunk (52) within the repository will be readily known by extracting the associated position data. The index (44) grows continuously as new versions are incorporated into the repository and the hash values associated with the chunks of each version (calculated in a manner described above) are added to the index.

Returning to FIG. 4, the index (44) is searched for the hash values of the distinguishing characteristics until at most n matches are found (step 43). More specifically, each of the k distinguishing characteristics of the input chunk is searched in the index in an attempt to find matches, and this continues until at most n distinguishing characteristics are matched. Let j ($<=$n) refer to the number of matched distinguishing characteristics. Obviously, if n matches are found before the entire k distinguishing characteristics of the input chunk are checked (say only i out of the k values are checked), the need to check the rest (i.e. by this example k−i) is obviated.

Note that the computational complexity for finding these j matches is low since it requires searching the index (by this example, a hash table) at most k times, each time with complexity of O(1).

In one embodiment, a version chunk that has $j \geq 2$ matching distinguishing characteristics is considered as matched with one or more repository chunks. On the other hand, a version chunk that has $0 \geq j \geq 1$ matching distinguishing characteristics is considered to be unmatched with any of the repository chunks. One match is considered not statistically significant because of the well known birthday paradox.

It should be noted that a distinguishing characteristic of the version chunk may match multiple distinguishing characteristics of the repository chunks. It is also possible that two version distinguishing characteristics are matched with two repository distinguishing characteristics which are well apart from each other, and may belong to two separate repository chunks. It then arises from the foregoing that a version chunk may be matched with multiple repository chunks. For each such repository chunk i, let $h_i$ be the number of such matching distinguishing characteristics. In one embodiment, a level of similarity between the repository chunk i and the version chunk is measured by the ratio between $h_i$ and n; where this ratio exceeds a threshold, the repository chunk can be considered sufficiently similar to the version chunk (step 45 in FIG. 4).

Consider, for example, a version that has undergone some changes compared to an older version of binary data stored in a repository. Normally, such changes are reflected in a small percentage of the seeds undergoing some local changes. The net effect is that for a given chunk, most of it is left intact. Since the positions of the distinguishing characteristics of the chunk are chosen to be properly spread (geographically across the chunk), the local change will affect only a few, if any, of the distinguishing characteristics and the rest will not change. In other words, this representation method is robust, since even a large percentage of localized change(s) will still leave many distinguishing characteristics intact. Statistically, in certain embodiments, if the search finds a repository chunk with at least two matches (meaning that in the latter example j$>$=2), then the repository and version chunks are sufficiently similar to be worth comparing further.

In select embodiments, to improve the uniform spread of the distinguishing characteristics upon the version chunk (which may eventually also be a part of the repository), the chunk is further divided into u sub-chunks. For each sub-chunk k/u distinguishing characteristics are computed, that constitute together k distinguishing characteristics.

In select embodiments, to improve the significance of each match of distinguishing characteristics, a list of highly recurring distinguishing characteristics is maintained. When a distinguishing characteristic is calculated for a number of version chunks that exceeds some threshold, it is considered to belong to some systematic pattern in the data, thus yielding reduced distinguishing information. It is then added to a list of recurring values, to avoid its usage as it occurs for succeeding chunks. Upon calculation of a distinguishing characteristic, its value is checked for existence in the said list, and if it exists, it is discarded and another distinguishing characteristic is computed in its place.

In the described embodiment, more than n and up to k distinguishing characteristics are possibly searched for in the index, whilst only n are stored in the index in respect of each repository chunk. By this embodiment, there are two possible effects on maximum hash values that may be caused by changes to the version chunk with respect to the repository: the first effect is that a maximum hash value could disappear because the data that comprises its corresponding seed has been modified; the second effect is that changed data could introduce a higher maximum value, displacing a still existing maximum. In cases involving the second effect, searching for more distinguishing characteristics provides more stability since a prior maximum has not disappeared, it has only been displaced. These two effects are reasons for selecting the maximum values in descending order, and/or for choosing k$>$n.

Figure 6:
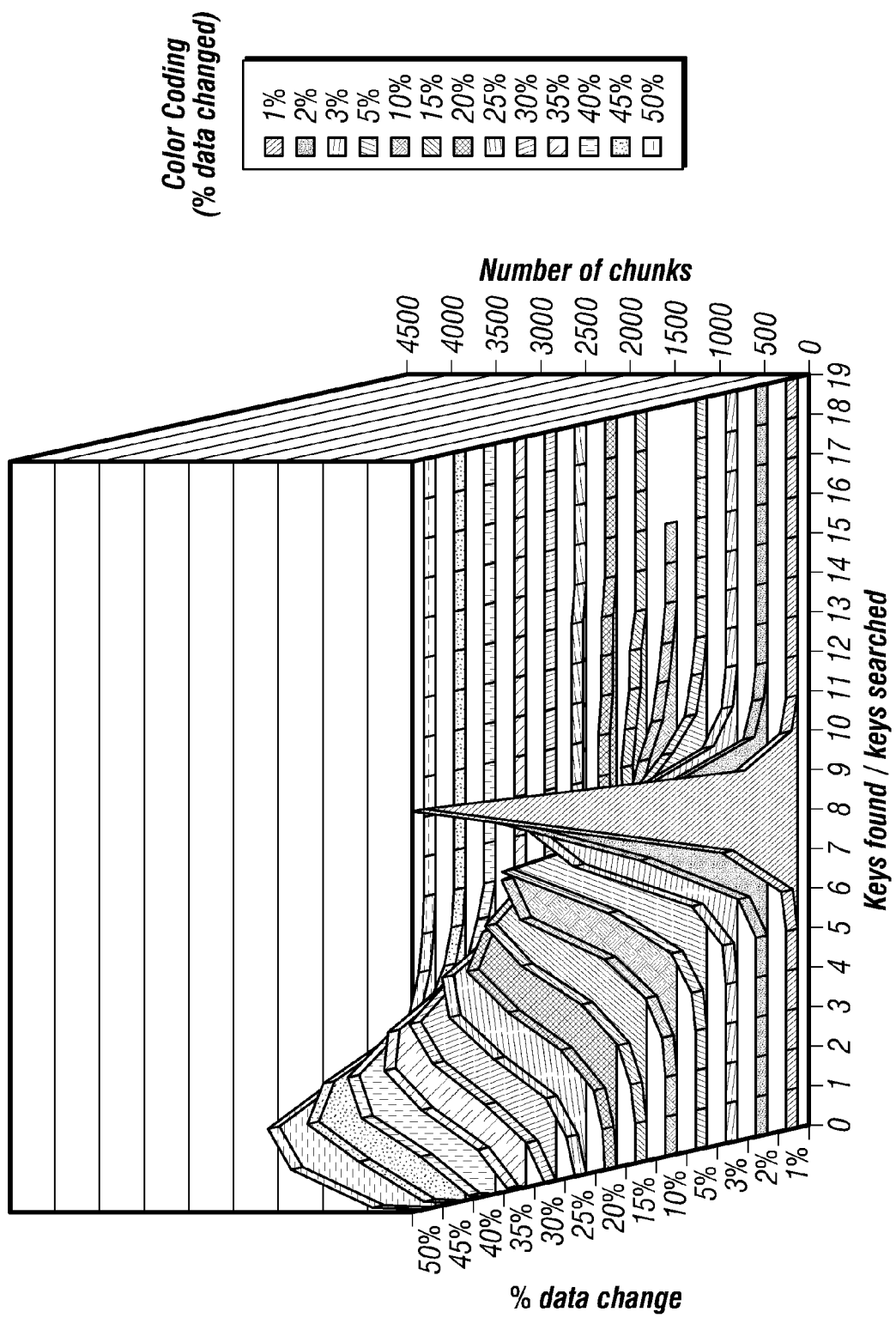
FIG. 6 is a representation of a three-dimensional graph illustrating the results of a similarity search in a particular example, showing how the distinguishing characteristics may be substantially preserved despite changes to the data.

FIG. 6 shows an example of how the distinguishing characteristics may be substantially preserved, despite changes to the data. In this example, the data is mp3 data, the repository size is 20 GB, the version size is tens of thousands of chunks, the chunk size is 32 MB, and the number of distinguishing characteristics calculated for each chunk is 8. In the three-dimensional color-coded representation of the search results shown, the horizontal axis (width) denotes the number of keys (distinguishing characteristics) found, and the number searched. The left margin axis (depth) denotes the percentage of data seeds changed, in the version. The right margin axis (height) denotes the number of chunks for which keys were searched and found. Thus, each row (in depth) shows the effect on the number of distinguishing characteristics given some percentage of the seeds that were changed. For example, in the $5^{th}$ row, 10% of the data was changed, yet the mean of about 5,000 chunks had 7 of their 8 distinguishing characteristics intact, and over 95% of these chunks had 4 or more of their 8 distinguishing characteristics still present. In the $4^{th}$ through $1^{st}$ rows, where respectively 5%, 3%, 2% and 1% of the data was changed, the preservation of distinguishing characteristics is progressively greater. As the percent data change increases, setting a lower threshold (number of minimal matches of distinguishing characteristics in the repository and input) will allow more findings of similar data. In this example where the peak for a 25% data change ($8^{th}$ row) is centered at about 4 keys found, if the threshold is set at 4 (out of k input distinguishing characteristics) then the similarity search will return substantially all repository locations where up to 25% of the data is changed. If for the same 25% data change the threshold is set higher, e.g., at 6, then the search will return a much lower percentage of similar repository locations. Thus, a graph such as FIG. 6, can assist the user in selecting the values for j, k, m, and n in a particular application.

Returning again to FIG. 4, where one or more sufficiently similar repository chunks are found the position of each matched repository chunk is extracted from the index (45-46). It is recalled that the position data of the repository chunk (associated with the j found hash values) can be readily retrieved from the index. The succeeding steps may use one or more of the matched repository chunks, and may rank the repository chunks by their level of similarity. In this embodiment, there follows a factoring step involving the version chunk and its matched repository chunks (47), that leads to a storage-efficient incorporation of the version chunk in the repository. In such a factoring backup and restore system, the further steps involve identifying the common (identical) and uncommon (not identical) data in the version and repository, and storing only the uncommon data of the version (keeping the stream consistent by using appropriate pointers), hence saving storage. For example, in a typical backup and restore system, the data may have changed by 1% between backups. The second backup can be added to the repository by adding only 1% of its data to the repository, and maintaining pointers to where the rest of the data can be found, effectively saving 99% of the space required.

In a next step (48) of this embodiment, the distinguishing characteristics of the matched parts of the repository are removed from the index. This step is performed in order to eliminate from the index any reference to the "old" parts, now replaced with a more updated version of the new input chunk. In a next step (49), the n most significant distinguishing characteristics of the new chunk are added to the index. In this embodiment, a distinguishing characteristic A is more significant than another distinguishing characteristic B if the hash value of the maximal seed of A is greater than that of B. Note that this is done at substantially no cost, since n is small and removing and inserting each one of the n values to the hash table may be performed at O(1) operations. Processing of the version chunk is now done (404).

In FIG. 4, if no match has been found (i.e. j less than some threshold of matches found) (401-402), the new version chunk is processed by some alternate process since similar repository data was not found (403). In one example, the version chunk can be stored in the repository without factoring. In accordance with an index update policy of the present embodiment, the distinguishing characteristics of the version chunk are added to the index (49). The process (404) is then terminated (in either match success or match fail route described above), until a new version chunk is processed.

Note that the invention is not bound by the foregoing example of an index update policy. For other applications it might be appropriate to keep all of the distinguishing characteristics of both the version chunk and all its matching repository parts; or alternatively, avoid the addition of the version chunk's distinguishing characteristics; or possibly, update the index with some mixture of the version and the repository chunks' distinguishing characteristics.

Specifically in this embodiment, where the version chunk's distinguishing characteristics replace all of the matched repository parts' features, another index, called a reverse index, can be used to identify all of the distinguishing characteristics (some possibly not matched with the version chunk's distinguishing characteristics) associated with the relevant repository parts. The reverse index is keyed by the locations in the repository, and maps these locations to their associated distinguishing characteristics. This reverse index also facilitates maintaining the consistency of the main index, in cases of deletion of parts of the repository.

Also note that the invention is not bound by this embodiment where the index starts empty. For other applications it might be appropriate to load the index based on an existing body of repository data, via the foregoing process of dividing the repository into chunks, calculating their distinguishing characteristics, and building the index based on this information. In such a case, the index may or may not be further updated by the incoming version chunks, according to some update policy of the type mentioned above.

It is emphasized that the computational complexity of searching the repository for data that is similar to the version data is proportional to the size of the version, O(version), and is designed to be independent of the size of the repository. This search requires in accordance with the non-limiting embodiments described above no more than k hash table searches of O(1) each per version chunk. Since k<m (m being the size of a version chunk), it arises that by the specified embodiments, the computational complexity for finding a similar chunk in the repository does not exceed O(version), the complexity of calculating the distinguishing characteristics, and this is true irrespective of the repository size. The search procedure for similar data is thus very efficient, even for very large repositories.

Furthermore, it is emphasized that the space needed for the index is proportional to the ratio between the number of distinguishing characteristics stored per chunk of repository, and the size of the chunk, i.e., the ratio between n and m. By one embodiment, where n is 8 and m is 32 MB, and the space needed to store each distinguishing characteristic is 16 bytes, a total of 128 bytes is stored in the index for each 32 MB of repository, a ratio of better than 250,000:1. Stated differently, a computer system with a RAM memory of 4 GB can hold in its memory the index needed for a 1 PB repository, facilitating rapid searching of the index and hence the rapid finding of similar data in a very large repository for an arbitrary input chunk.

It should be noted that once similar chunks are found based on identifying matched distinguishing characteristics in the manner described above, it may be of interest to identify the exact differences between the similar chunks. In such cases, a more detailed comparison (or supplemental) algorithm may be applied, for comparing the full data of the respective chunks (and not only the n distinguishing characteristics). Typical, yet not exclusive, examples of such algorithms are binary difference and byte-wise factoring types of algorithms. An improved binary difference algorithm is described below, which can advantageously be used in select embodiments.

The supplemental algorithm may be less efficient (in terms of computational resources) compared to the synchronization (similarity search) algorithm just described. The degraded efficiency may stem from the fact that in the supplemental algorithm all of the data of a given repository chunk is processed, whereas in the similarity search algorithm only partial data associated with the chunk is processed (i.e. data that included the distinguishing characteristics). However, because the supplemental algorithm is applied to only one repository chunk of size m (e.g. 32 MB), or possibly to a few such repository chunks that have already been found to be sufficiently similar to an input chunk, the degraded performance may be relatively insignificant in select applications. This is especially true compared to the alternative of executing the supplemental algorithm on an entire repository, especially one as large as 1 PB or more.

The foregoing embodiment of the similarity search algorithm exemplifies the use of an index to resolve a type of nearest neighbor query, for which the most similar repository chunks to the input version chunk are sought. This embodiment by no means limits the invention. The index can be used to resolve other kind of queries, such as range queries; the particular type of query being determined by the specific application.

For a better understanding of the foregoing similarity search, there follows a description which exemplifies certain embodiments of the invention. The invention is not bound by this example. For convenience of description the repository includes a single chunk and the example will illustrate how an input chunk is classified as sufficiently similar to the repository chunk.

Step 1: Build the Index for the Repository

This example uses the following repository string: "Begin-at-the-beginning-and-go-on-till-you-come-to-the-end;-then-stop." Note that this step is a by-product of previous iterations of the algorithm. It is included here explicitly for clarity of the example.

Step 1a: Calculate the Hashes

The example uses a rolling hash function to calculate the hash values at every byte offset. It uses a modular hash function, which utilizes, for the sake of illustration, the prime number 8388593; the hash function used is h(X)=X mod 8388593. In this example, the seed size is 8 bytes.

Input string: "Begin-at-the-beginning-and-go-on-till-you-come-to-the-end;-then-stop."

Calculated Hash Values:

| pos'n | substring | hash value |
|---|---|---|
| 0 | Begin-at | 2631922 |
| 1 | egin-at- | 2153376 |
| 2 | gin-at-t | 4684457 |
| 3 | in-at-th | 6195022 |
| 4 | n-at-the | 6499883 |
| 5 | -at-the- | 7735648 |
| 6 | at-the-b | 0614663 |
| 7 | t-the-be | 6086781 |
| 8 | -the-beg | 1071229 |
| 9 | the-begi | 5796378 |
| 10 | he-begin | 2225405 |
| 11 | e-beginn | 5559942 |
| 12 | -beginni | 4351670 |
| 13 | beginnin | 6729979 |
| 14 | eginning | 2678539 |
| 15 | ginning- | 4908613 |
| 16 | inning-a | 4858800 |
| 17 | nning-an | 8359373 |
| 18 | ning-and | 5615355 |
| 19 | ing-and- | 7788491 |
| 20 | ng-and-g | 3386892 |
| 21 | g-and-go | 7726366 |
| 22 | -and-go- | 4784505 |
| 23 | and-go-o | 95438 |
| 24 | nd-go-on | 7382678 |
| 25 | d-go-on- | 7239157 |
| 26 | -go-on-t | 6674727 |
| 27 | go-on-ti | 5842463 |
| 28 | o-on-til | 655214 |
| 29 | -on-till | 4407765 |
| 30 | on-till- | 4313035 |
| 31 | n-till-y | 1287538 |
| 32 | -till-yo | 7161694 |
| 33 | till-you | 4677132 |
| 34 | ill-you- | 910513 |
| 35 | ll-you-c | 4229050 |
| 36 | l-you-co | 5739894 |
| 37 | -you-com | 6640678 |
| 38 | you-come | 5514508 |
| 39 | ou-come- | 4252699 |
| 40 | u-come-t | 2618703 |
| 41 | -come-to | 2171878 |
| 42 | come-to- | 2350287 |
| 43 | ome-to-t | 5286613 |
| 44 | me-to-th | 7254292 |
| 45 | e-to-the | 8189031 |
| 46 | -to-the- | 6310941 |
| 47 | to-the-e | 4987766 |
| 48 | o-the-en | 4935558 |
| 49 | -the-end | 1270138 |
| 50 | the-end; | 6385478 |
| 51 | he-end;- | 2040253 |
| 52 | e-end;-t | 104001 |
| 53 | -end;-th | 137211 |
| 54 | end;-the | 1568370 |
| 55 | nd;-then | 5917589 |
| 56 | d;-then- | 1274465 |
| 57 | ;-then-s | 6437500 |
| 58 | -then-st | 5140383 |
| 59 | then-sto | 7314276 |
| 60 | hen-stop | 4932017 |
| 61 | en-stop. | 2199331 |

Step 1b: Calculate the Maximal Values

Find the n text positions with the maximal hash values. In this example, for n=4, these are:

| | | |
|---|---|---|
| 17 | nning-an | 8359373 |
| 45 | e-to-the | 8189031 |
| 19 | ing-and- | 7788491 |
| 5 | -at-the- | 7735648 |

Step 1c: Move One Character to the Right

As noted previously, the maximum hash values themselves do not have a sufficiently uniform probabilistic distribution; hence, for each seed corresponding to one of the maximum hash values, we use the hash value of the seed that follows by one character. These hash values are used as the distinguishing characteristics for the purposes of this example and, together with their positions, they constitute the index for this example.

| | | |
|---|---|---|
| 18 | ning-and | 5615355 |
| 46 | -to-the- | 6310941 |
| 20 | ng-and-g | 3386892 |
| 6 | at-the-b | 614663 |

Step 2: Match the Version

The repository was modified to "Start-at-the-beginning-and-continue-to-the-end;-then-cease." This modified repository is regarded as the version (by this example having only one chunk).

Step 2a: Calculate the Hashes

Input string: "Start-at-the-beginning-and-continue-to-the-end;-then-cease."

Calculated Hash Values:

| pos'n | substring | hash value |
|---|---|---|
| 0 | Start-at | 3223635 |
| 1 | tart-at- | 6567590 |
| 2 | art-at-t | 6718044 |
| 3 | rt-at-th | 8274022 |
| 4 | t-at-the | 7882283 |
| 5 | -at-the- | 7735648 |
| 6 | at-the-b | 614663 |
| 7 | t-the-be | 6086781 |
| 8 | -the-beg | 1071229 |
| 9 | the-begi | 5796378 |
| 10 | he-begin | 2225405 |
| 11 | e-beginn | 5559942 |
| 12 | -beginni | 4351670 |
| 13 | beginnin | 6729979 |
| 14 | eginning | 2678539 |
| 15 | ginning- | 4908613 |
| 16 | inning-a | 4858800 |
| 17 | nning-an | 8359373 |

-continued

| pos'n | substring | hash value |
|---|---|---|
| 18 | ning-and | 5615355 |
| 19 | ing-and- | 7788491 |
| 20 | ng-and-c | 3386888 |
| 21 | g-and-co | 7725342 |
| 22 | -and-con | 4522439 |
| 23 | and-cont | 115291 |
| 24 | nd-conti | 4076448 |
| 25 | d-contin | 8092248 |
| 26 | -continu | 6962606 |
| 27 | continue | 4042146 |
| 28 | ontinue- | 2195597 |
| 29 | ntinue-t | 4481950 |
| 30 | tinue-to | 2849052 |
| 31 | inue-to- | 2683241 |
| 32 | nue-to-t | 5063413 |
| 33 | ue-to-th | 708899 |
| 34 | e-to-the | 8189031 |
| 35 | -to-the- | 6310941 |
| 36 | to-the-e | 4987766 |
| 37 | o-the-en | 4935558 |
| 38 | -the-end | 1270138 |
| 39 | the-end; | 6385478 |
| 40 | he-end;- | 2040253 |
| 41 | e-end;-t | 104001 |
| 42 | -end;-th | 137211 |
| 43 | end;-the | 1568370 |
| 44 | nd;-then | 5917589 |
| 45 | d;-then- | 1274465 |
| 46 | ;-then-c | 6437484 |
| 47 | -then-ce | 5136272 |
| 48 | then-cea | 6261846 |
| 49 | hen-ceas | 3944916 |
| 50 | en-cease | 1159320 |
| 51 | n-cease. | 1863841 |

Step 2b: Calculate the Maximal Values

Find the k text positions with the maximum hash values. In this example, for k=8, these are:

| 17 | nning-an | 8359373 |
|---|---|---|
| 3 | rt-at-th | 8274022 |
| 34 | e-to-the | 8189031 |
| 25 | d-contin | 8092248 |
| 4 | t-at-the | 7882283 |
| 19 | ing-and- | 7788491 |
| 5 | -at-the- | 7735648 |
| 21 | g-and-co | 7725342 |

Step 2c: Move One Character to the Right

As noted previously, the maximum hash values themselves do not have a sufficiently uniform probabilistic distribution; hence, we use the hash value of the seed that follows by one character. These positions are used as the distinguishing positions and these eight hash values are used to search the index.

| 18 | ning-and | 5615355 |
|---|---|---|
| 4 | t-at-the | 7882283 |
| 35 | -to-the- | 6310941 |
| 26 | -continu | 6962606 |
| 5 | -at-the- | 7735648 |
| 20 | ng-and-c | 3386888 |
| 6 | at-the-b | 614663 |
| 22 | -and-con | 4522439 |

Step 2d: Match

The version hash values 5615355 (version position 18), 6310941 (version position 35) and 614663 (version position 6) were found in the index. They correspond to positions in the repository 18, 46 and 6 respectively. A match is declared: the algorithm identified that "Start-at-the-beginning-and-continue-to-the-end;-then-cease." is similar data to "Begin-at-the-beginning-and-go-on-till-you-come-to-the-end;-then-stop.", and it found the corresponding positions.

Note that by this example, the threshold for similarity (being the number of minimal matches of distinguishing characteristics) is j=2. Had this threshold been set to 4, the chunks would not be regarded sufficiently similar, since only three matches were found. Note also that by this example n was set to 4, meaning the number of distinguishing characteristics of a repository chunk is 4, and k was set to 8, meaning the number of distinguishing characteristics calculated for a version chunk is 8. By setting k>n, the search returns the repository location of the number 7735648, which was moved from fourth maximal value in the repository to fifth maximal value in the input and thus would not have been found if k was set to 4 (k=n).

This example illustrates how to find similar chunks in a degenerated case of a repository holding only one chunk. However, even for an index storing distinguishing characteristics of numerous chunks, the search procedure would still be very efficient, since search within the index (e.g., here stored as a hash table) is done in a very efficient manner, even for a large index. Note also that the data stored in respect of each index entry is small (in this example the hash value and position), and accordingly in many applications the index can be accommodated within the internal fast memory of the computer, obviating the need to perform slow I/O operations, thereby further expediting the search within the index.

Complexity (of Synchronization Algorithm)

The time needed to calculate the hashes of the seeds of a version chunk is linear in the size of the chunk because a rolling hash is used. The time needed to calculate the k maxima is $O(m*\log(k))$, which is reasonable because k is small. The time needed to search the index for the k distinguishing characteristics if the index is a binary tree is $O(k*\log(r))$, where $r=(R*k)/m$ is the number of entries in the index, where R is the size of the repository (up to about $2^{50}$), k is small (typically $2^3$) and m is the chunk size (typically $2^{25}$), so r is typically $2^{28}$, and $\log(r)=28$. Since k is small, searching the index overall is acceptable. The time needed to search the index for the k distinguishing characteristics if the index is represented as a hash table is $k*O(1)$. Therefore the chunk search time is dominated by the time it takes to calculate and order the maxima, namely $O(m*\log(k))$, and hence is equivalent to a small number of linear scans of the version chunk. Since k is small, the overall search time is acceptable. Note that this result is a fraction of the complexity of the brute force algorithm, which is $O(R*m)$, the product of the size of the repository R with the size of the chunk m.

The complexity of the time needed to insert a version chunk into the index is the same as that for searching the index. No extra time is needed to calculate the n distinguishing characteristics since these were already calculated.

The space requirements for this algorithm are those needed by the index. Each entry has for the given example parameters of 16 bytes, including key (distinguishing characteristic) and position data, and there are $2^{28}$ (the value of r calculated above) of them in 1 PB, so a 4 GB index is needed to manage 1 PB of repository data.

The system according to the present embodiment may be executed on a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Binary Difference Algorithm

A new binary difference algorithm is now described that efficiently computes the common sections of two data intervals. In the described embodiment, the algorithm uses the output of the previously described similarity search (synchronization) algorithm, that specifies for a given version chunk the locations of several pairs of matching distinguishing characteristics in the version and repository data. A pair of locations of matching distinguishing characteristics (one in the repository and one in the version) is herein denoted as an anchor. The anchors are used for alignment and to prune from further processing repository intervals that are not likely to contain matches with the version, and thus focus on the repository intervals that are most similar to the version chunk. This reduces the processing time of the algorithm.

Based on the anchors, corresponding intervals are defined as pairs of version and repository intervals that are most likely to contain matching sections (identical data). The binary difference process is used on each of these interval pairs. Using the analog of sliding windows, instead of positioning the repository and version windows in matching offsets, we position them according to the anchors (possibly in non-matching offsets).

One advantage of the present algorithm is use of a seed step size on one interval of the interval pair. While known binary difference or delta algorithms move in byte steps on both intervals, the present algorithm moves in for example byte steps only on one interval (the version interval), and in seed size (e.g. multiple byte) steps on the other interval (the repository interval). This technique speeds up processing and reduces space requirements, while not lessening the matching rate (since matches are expanded both backward and forward). Another advantage of the present algorithm is that, while known binary delta algorithms produce both add and copy directives, the present algorithm can be used to produce only copy directives, in sorted order. The add directives can then be implicitly deduced, as needed, from the copy directives, thus decreasing the storage required for the algorithm's output.

Figure 7:
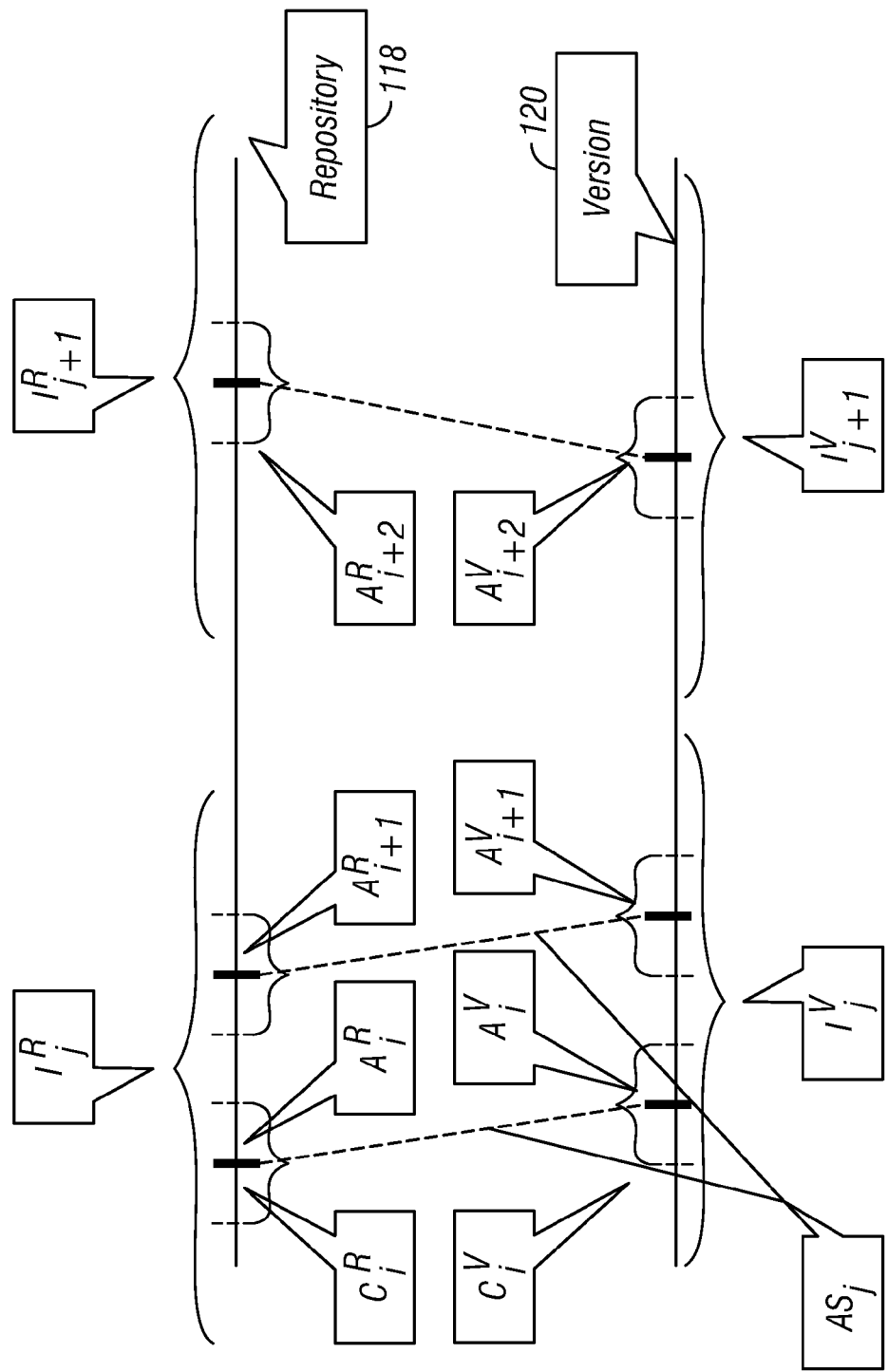
FIG. 7 is a schematic representation of corresponding intervals in a version and repository, defining the symbols used in an embodiment of the binary difference algorithm.
Figure 8:
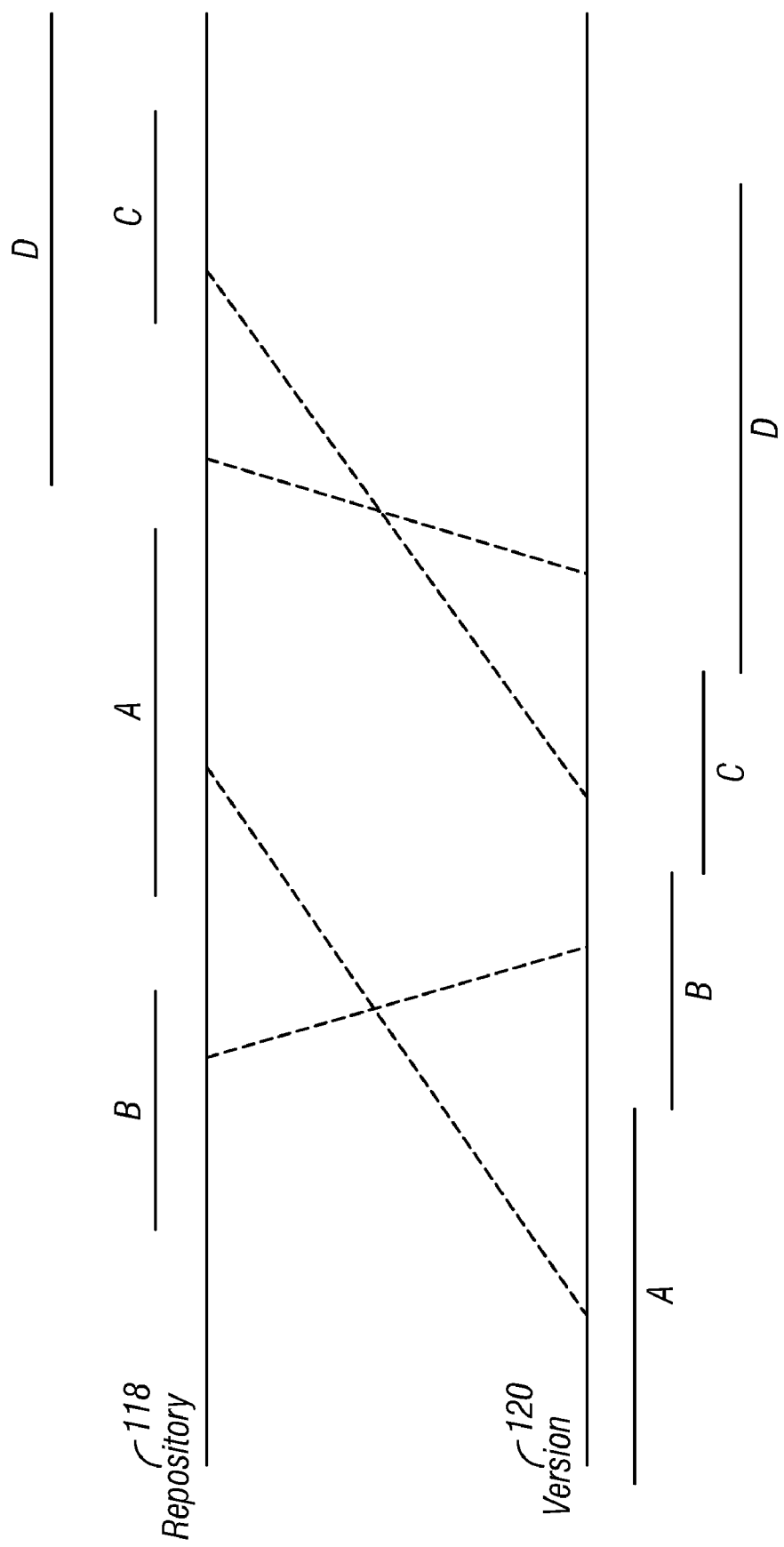
FIG. 8 is a schematic representation of corresponding intervals of a version and repository, showing anchor sets.

The following table defines the symbols used in the present embodiment, while FIGS. 7-8 illustrate the elements graphically.

| Symbol | Specification |
|---|---|
| $A_i^R$ | Anchor i in repository. |
| $A_i^V$ | Anchor i in version. |
| $AS_j$ | Anchor set j, grouping two or more anchors having the same repository offset estimator. |
| $C_i^R$ | Copy interval (expansion) around anchor i in the repository. |
| $C_i^V$ | Copy interval (expansion) around anchor i in the version. |
| $I_i^V$ | Corresponding Interval associated with anchor i in the version. |
| $I_i^R$ | Corresponding Interval associated with anchor i in the repository. |
| O(A) | Offset of anchor in a string. |
| LO(C/I) | Offset of left-most (first) byte of an interval. |
| RO(C/I) | Offset of right-most (last) byte of an interval. |
| S(C/I) | Size of an interval. |

Figure 9:
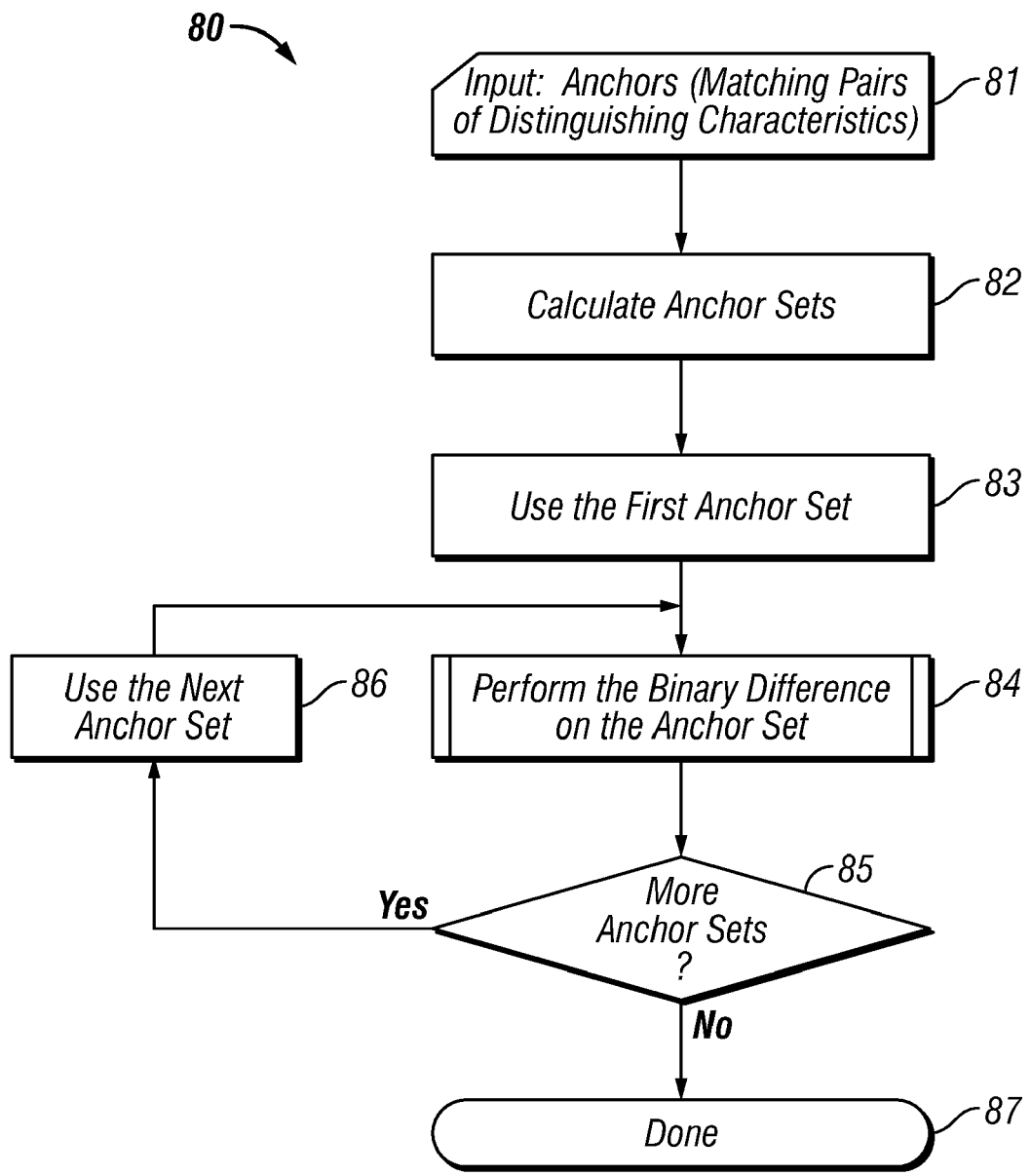
FIG. 9 is a flowchart showing exemplary steps for calculating anchor sets and performing a binary difference process on each anchor set, in accordance with an embodiment of an invention.
Figure 10:
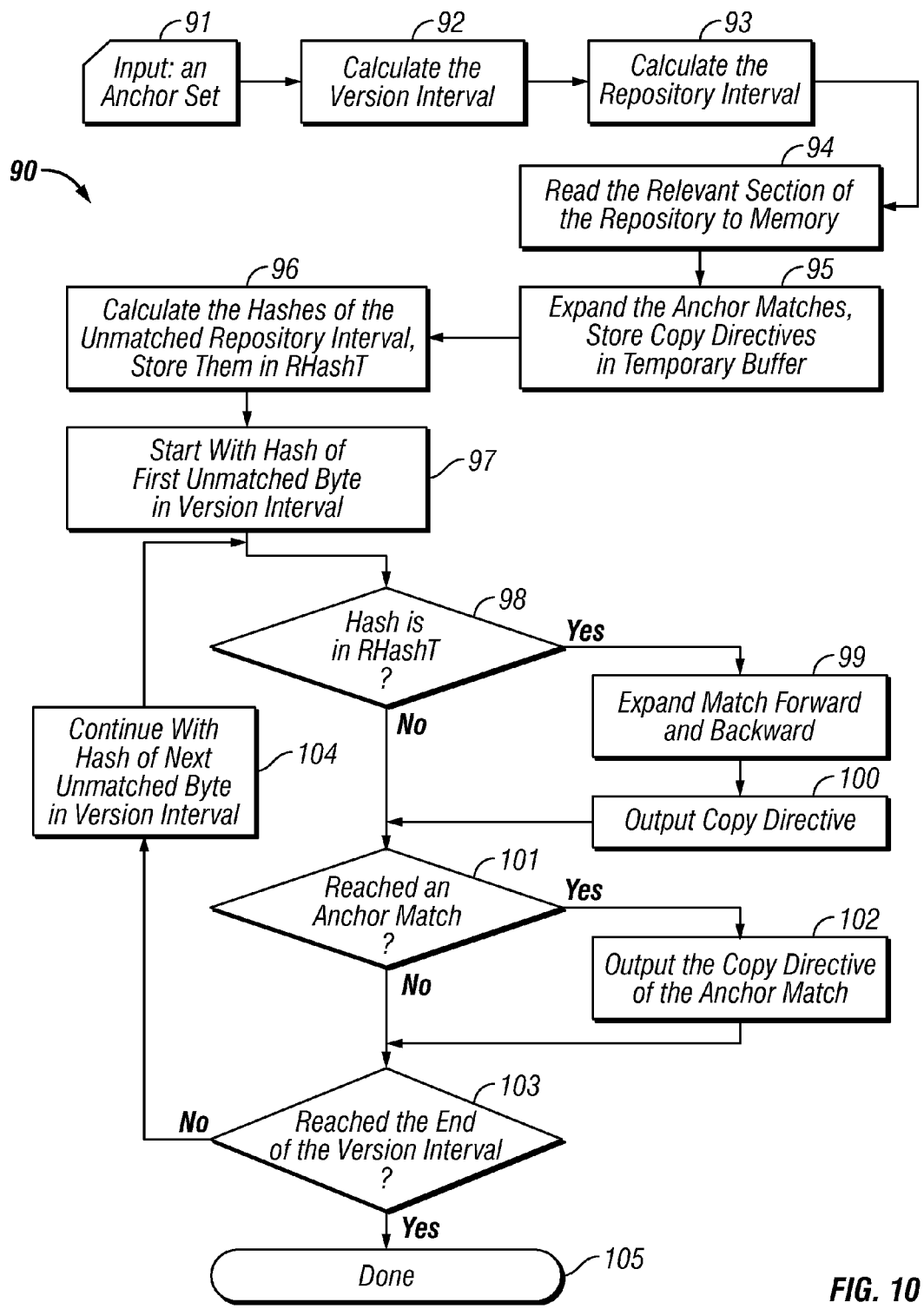
FIG. 10 is a more detailed sequence of steps for processing the anchor sets, according to one embodiment.
Figure 11:
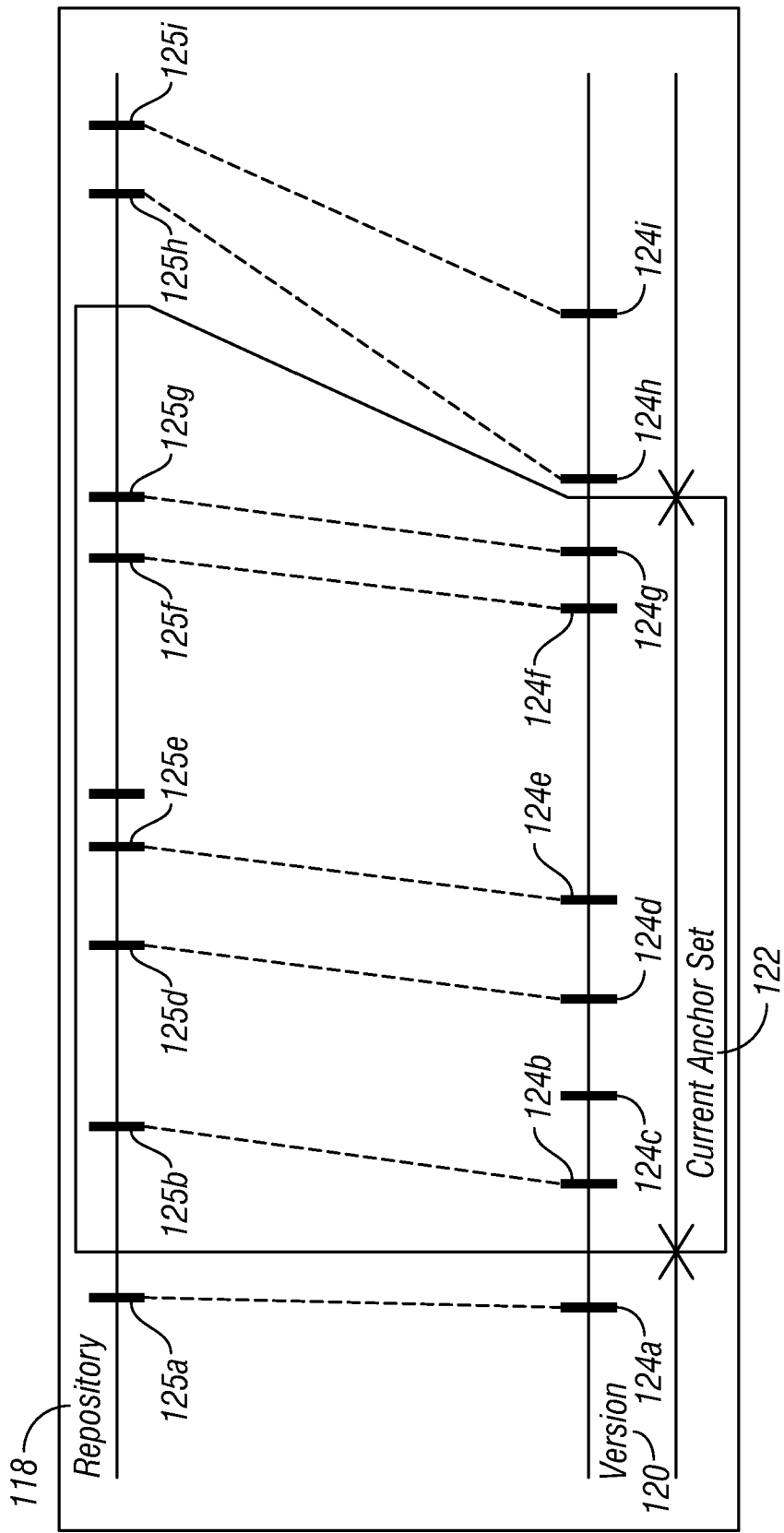
FIG. 11 is a schematic representation of a version and repository, illustrating the anchors in an anchor set according to one embodiment of the invention.
Figure 12:
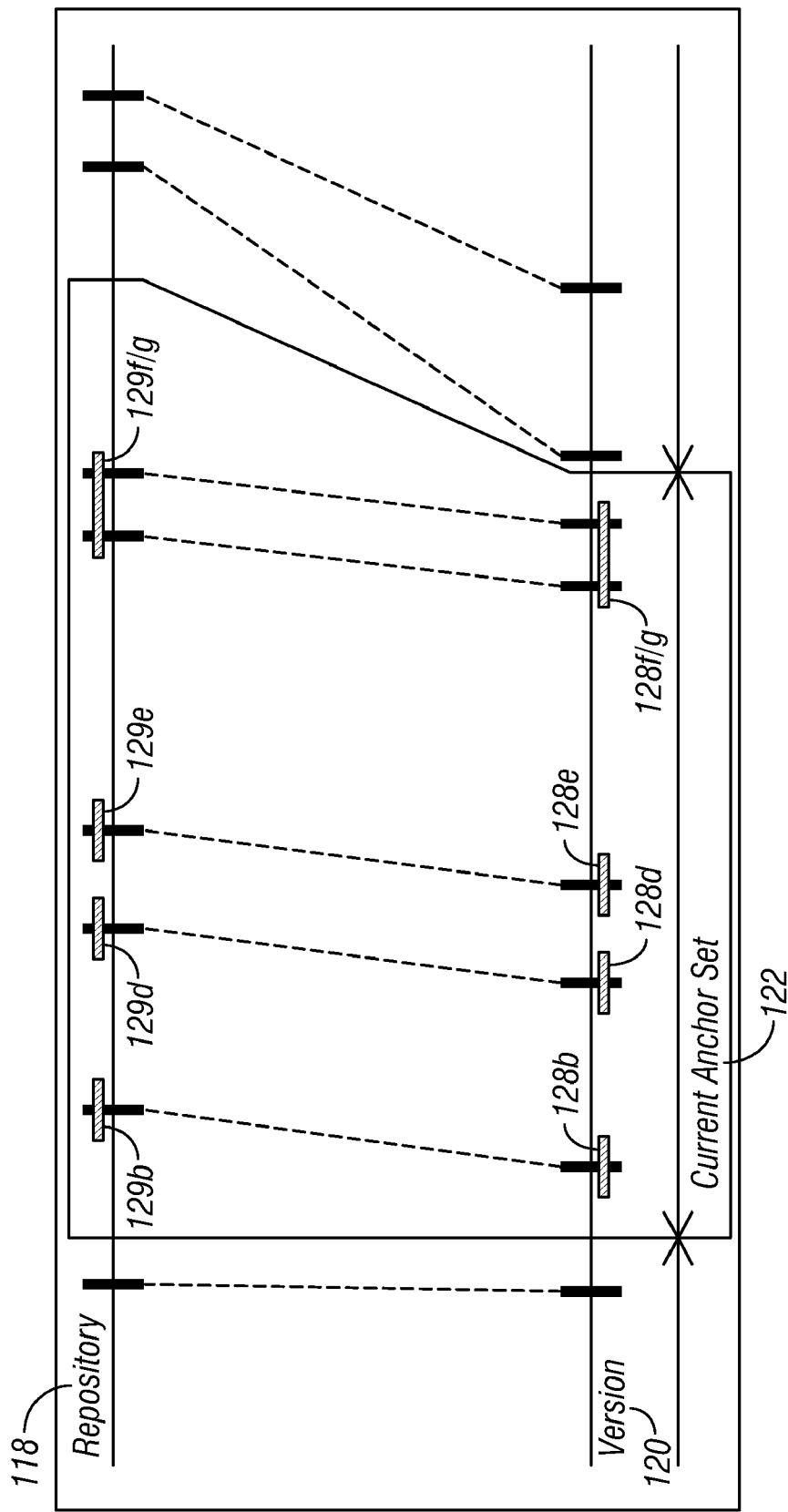
FIG. 12 is a schematic representation of the same version and repository of FIG. 11, illustrating the step of expanding the matches around the anchors.
Figure 13:
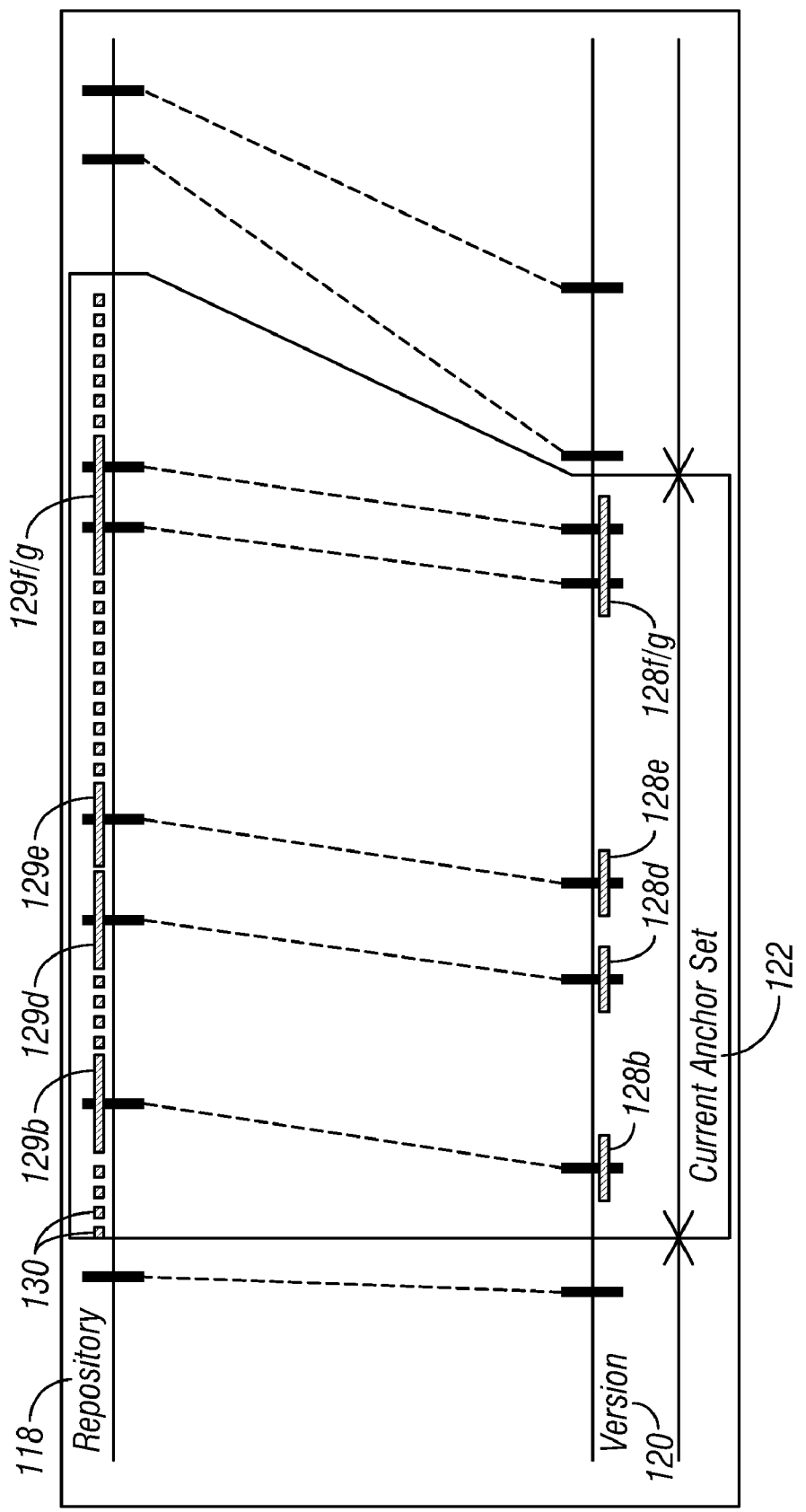
FIG. 13 is a schematic representation of the same version and repository of FIG. 11, illustrating the step of calculating hash values between expanded anchor matches in the repository.
Figure 14:
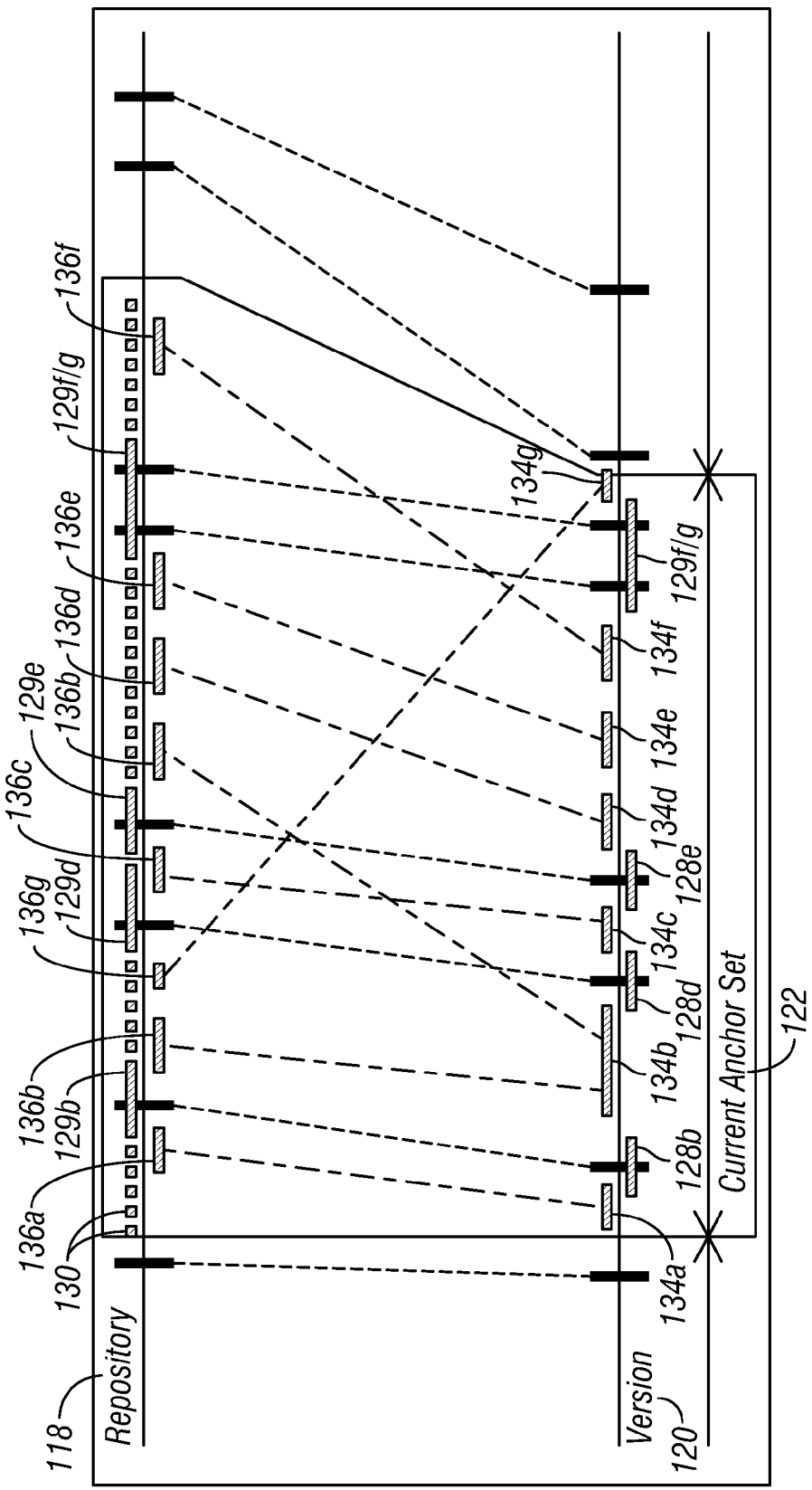
FIG. 14 is a schematic illustration of the same version and repository of FIG. 11, illustrating the step of expanding matches and the correspondence of matches in the version and repository.

FIG. 9 is high-level (overview) flow chart showing the steps of one embodiment of the binary difference process operating on an anchor set. FIG. 10 is a more detailed flow chart showing the algorithm operating within an anchor set. FIGS. 11-14 show an example of operating on a version interval and repository interval in accordance with this embodiment.

The inputs in the described embodiment are a version chunk, an array of hash values at byte offsets associated with the version chunk, and a set of anchors linking the version chunk and the repository data. The latter two inputs are produced by the synchronization (similarity search) algorithm. The output of the binary difference algorithm is a set of pairs of matching (i.e. identical) intervals in the version chunk and repository data. A pair of matching intervals is denoted as a copy interval. Each copy interval may be coded as a copy directive, containing the start offsets of the associated intervals in the version and repository, and the interval size. The copy directives refer to separate (non-overlapping) version intervals, and are produced by the algorithm sorted in ascending version offset order.

In FIG. 9, a flow chart (80) illustrates the steps of performing one embodiment of the binary difference algorithm. As is shown, the process starts by receiving as input the anchors from the similarity search and the version chunk's hash values at byte offsets (81). Next, the anchor sets are calculated (82); this may be accomplished as described in Step 1 below. Then, using the first anchor set (83), the binary difference algorithm is performed on the anchor set; this may be accomplished as described with respect to FIG. 10. This process is repeated for additional anchor sets (84-86), until there are no more anchor sets in the version and processing is done (87).

A more detailed description is now given with respect to FIGS. 10-14. In FIG. 10, a flowchart (90) illustrates one embodiment of the binary difference algorithm operating on an anchor set (step 84 in FIG. 9). FIGS. 11-14 show a sequence of operations on one interval of a version chunk 120 and corresponding repository data 118. The interval is denoted as a current anchor set 122, and includes a plurality of locations of distinguishing characteristics 124 of version chunk 120, some of which have matching distinguishing characteristics 125 in repository data 118.

Step 1—Compute anchor sets (82 in FIG. 9): Sort the anchors by ascending order of their version offsets. Traverse the ordered anchors and associate them with anchor sets as follows: A pair of successive anchors $A_i$ and $A_{i+1}$ are in the same anchor set if they have the same repository offset estimator, here for example given by: $|[O(A_{i+1}^V)-O(A_i^V)]-[O(A_{i+1}^R)-O(A_i^R)]| \leq C$, where C is a constant selected for desired performance characteristics (discussed further below in regard to complexity). As long as successive anchor pairs belong to the same set, add them to the current set. When a successive pair does not belong to the same set, close the current set, open a new set, and add the later anchor to the new set. Denote the output of this step as $\{AS_j\}_1^m$ where m is the number of disjoint anchor sets identified. FIG. 7 illustrates an anchor set $AS_j$ including two anchors $A_i$ and $A_{i+1}$ linking the version 120 and repository 118. FIGS. 11-14 show a current anchor set 122 in version 120 and repository 118. For each anchor set in $\{AS_j\}_1^m$ steps 2-6 described below are performed (step 84 in FIG. 9). Let $AS_j$ be the current anchor set (step 91 in FIG. 10).

Step 2—Calculate the version interval (92 in FIG. 10): A version interval $I_j^V$ is associated with the current anchor set $AS_j$ (refer to FIG. 7). The interval $I_j^V$ starts one byte after the right offset of the last copy directive produced by the binary difference procedure run on the previous version interval $I_{j-1}^V$, or at the beginning of the chunk (if there is no previous anchor set $AS_{j-1}$), and ends one byte before the left most anchor in $AS_{j+1}$, or at the end of the chunk (if there is no $AS_{j+1}$).

Step 3—Calculate the repository interval (step 93 in FIG. 10): A repository interval $I_j^R$ is associated with the current anchor set $AS_j$. Let $A_l^R$ (in FIG. 11, l is 124b) be the left most anchor of $AS_j$ and $A_r^R$ (in FIG. 11, r is 124g) be the right most anchor of $AS_j$. Then $I_j^R=[O(A_l^R)-(O(A_l^V)-LO(I_j^V)), O(A_r^R)+(RO(I_j^V)-O(A_r^V))]$. We term the pair of intervals $I_j^V$ and $I_j^R$ as corresponding intervals. FIG. 8 illustrates 4 pairs of corresponding intervals (connected by dashed lines between version 120 and repository 118) each associated with a separate anchor set A-D. For each pair of corresponding intervals $I_j^V$ and $I_j^R$ calculated in this step, the binary difference procedure detailed below (steps 4, 5 and 6) is performed.

Where the present algorithm is a part of a factoring application, the corresponding repository interval $I_j^R$ is read from the repository into memory (step 94 in FIG. 10), enabling a comparison of the data in $I_j^V$ with that in $I_j^R$.

Step 4 (refer to FIG. 12)—Expand the anchor matches (step 95 in FIG. 10): Expand the matches around the anchors of the current anchor set $AS_j$ forwards and backwards, and code these matches as copy directives. These matches, illustrated in FIG. 12 by area 128 in version 120 and area 129 in repository 118, are called anchor matches. Store these copy directives in a temporary directives buffer. Denote the output of this step as the sets $\{C_i^R\}_l^n$ and $\{C_i^V\}_l^n$, where n is the number of anchors in the anchor set.

Step 5 (refer to FIG. 13)—Load the repository interval hash values into a hash table (step 96 in FIG. 10): Calculate the hash values of all consecutive non-overlapping seeds (areas 130 in FIG. 13) in $I_j^R$, excluding the expansions of the repository anchors (129) that lie in $I_j^R$, and store them in a hash table called RHashT.

Step 6 (refer to FIG. 14)—Search for matches (steps 97-105 in FIG. 10): For each consecutive (by byte offset) seed in $I_{j+1}^V$, excluding the expansions of the anchors (areas 128 in FIG. 14) that lie in $I_j^V$: Retrieve its hash value (recalling that these hash values are received as input from the products of the synchronization algorithm), and search for it in RHashT (step 98 in FIG. 10). If a match is found: expand it forwards and backwards (step 99 in FIG. 10) to the maximal expansion (areas 134 and 136 in FIG. 14) that does not overlap in the version the previous copy directive or the next anchor match or start or end of $I_j^V$, code it as a copy directive, and output it (step 100 in FIG. 10). If an anchor match is reached in the version (step 101 in FIG. 10), output its corresponding copy directive stored in the temporary directives buffer (step 102 in FIG. 10), and the next seed to be processed (step 104 in FIG. 10) is the first seed positioned after the anchor match in the version. If no anchor match is reached and the end of $I_j^V$ is also not reached (step 103 in FIG. 10), then the next seed to be processed in $I_j^V$ (step 104 in FIG. 10) is the next unmatched seed defined as follows: if the current seed was not matched then the next unmatched seed starts one byte after the first byte of the current seed; if on the other hand the current seed was matched and expanded, then the next unmatched seed is the one starting one byte after the last byte of the last seed included in the said expansion. If the end of $I_j^V$ is reached (step 103 in FIG. 10), then the processing of this anchor set $AS_j$ and associated corresponding intervals is done (step 105 in FIG. 10). If there is no next anchor set (step 85 in FIG. 9), the binary difference processing of the version chunk is complete (step 87 in FIG. 9). Otherwise processing continues to the next anchor set $AS_{j+1}$ (step 86 in FIG. 9) from step 2 detailed above.

Complexity (Binary Difference)

Storage: The embodiment of the binary difference algorithm described here uses a fixed sized hash table (RHashT), whose maximum size is proportional to the size of a chunk divided by the seed size, since the chunk size is an upper limit on the size of the repository interval. Hence the table size is sub-linear in the chunk size. In addition, temporary storage for the copy directives of the anchor matches is required. This is proportional to the number of anchors in a chunk, i.e. the number of its distinguishing characteristics, which is small. Therefore, the total storage requirements of the algorithm are sub-linear in the length of the chunk.

Time: The phase of expanding the anchor matches (step 95) and loading the repository hash values into RHashT (step 96) takes one linear pass on the corresponding intervals. The phase of searching for the version hash values in RHashT (step 98) and expanding their found matches (step 99) resembles the greedy algorithm, whose worst case time is quadratic in the corresponding interval length. However, by restricting the length of the hash table chains to a fixed size, the average time for this phase is between 1 to the length of the hash chain—linear passes on the corresponding intervals. Note that the running time is also a function of the amount of resemblance (identical data) between the version and repository intervals (the more resemblance, the less time required). There is also extra time taken by processing overlaps of successive corresponding intervals. It follows that the average total time required is 2 linear passes on the corresponding intervals.

The systems and methods disclosed herein may be embodied in various forms including, for example, a data processor, such as a computer. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Moreover, the computer readable media may be in the form of a signal on a carrier wave or may be in the form of a storage media such as a disk. Examples of program instructions include, for example, machine code, such as produced by a compiler, and files containing a high level code that can be executed by the computer using an interpreter.

Figure 15:
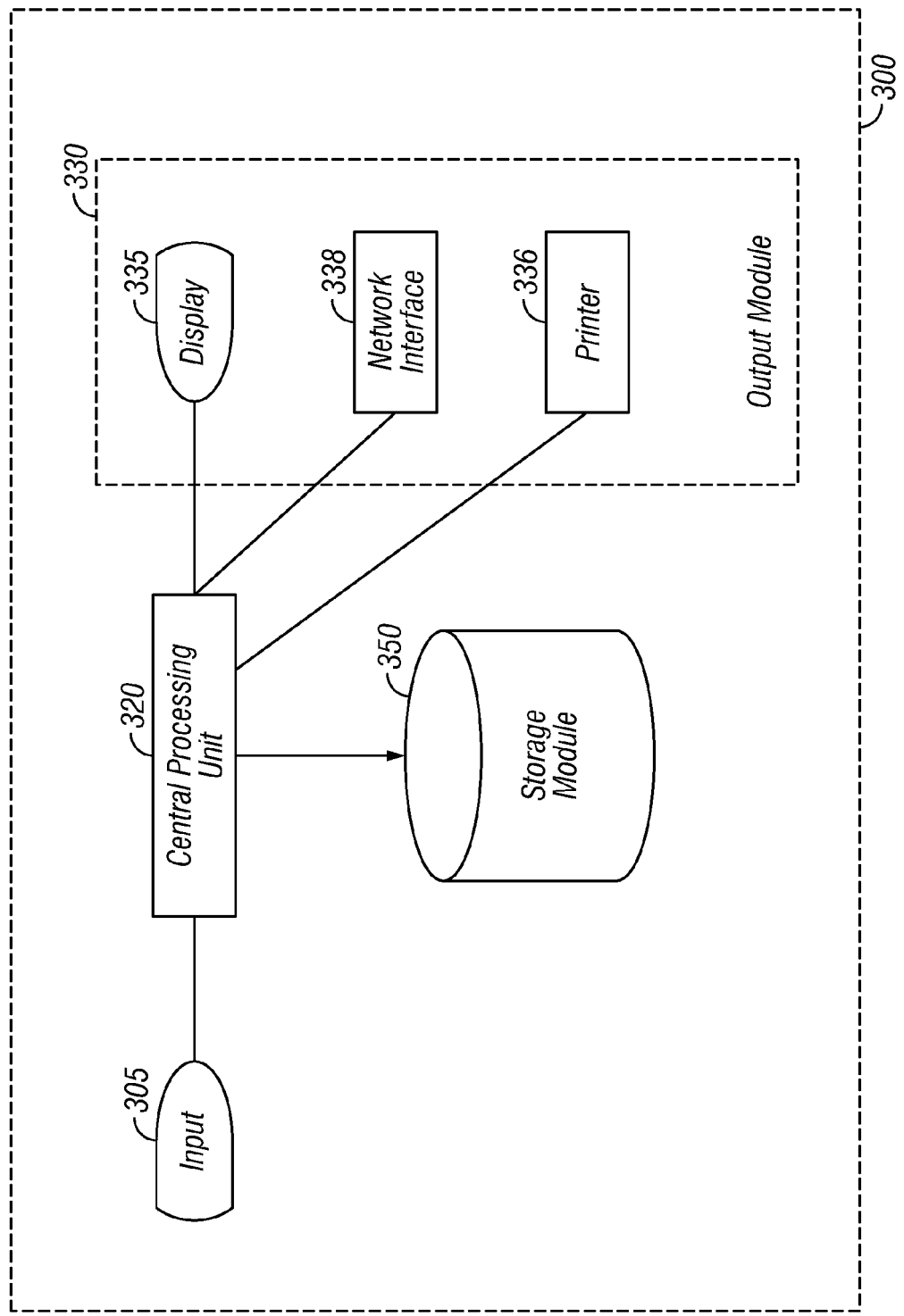
FIG. 15 illustrates an exemplary system environment.

As shown in FIG. 15, a data processor 300 receives input 305 and may include a central processing unit 320, a storage module 350, and/or an input/output (I/O) module 330. The I/O module 330 may include one or more input/output devices including a display 335, a keyboard, a mouse, an input storage device, a printer 336, and a network interface 338. The network interface permits the data processor to communicate through a network, such as a communications channel. The central processing unit may include, for example, one or more of the following: a central processing unit, a co-processor, memory, registers, and other processing devices and systems as appropriate.

A storage device may be embodied by a variety of components or subsystems capable of providing storage, including, for example, a hard drive, an optical drive, a general-purpose storage device, a removable storage device, and/or memory.

Various embodiments of the methods and systems of the invention described herein are useful for identifying data in an input stream that already exists in a repository. Products utilizing such systems and methods include backup-to-disk products to save disk storage space by not repeatedly storing backup data that has not changed since the previous time it was backed up. This saves the end user disk space when storing multiple backups in the same repository.

The systems and methods of the present invention may be included in storage equipment, intelligent switches, servers, and software applications. The methods and systems may be bundled with derivative products including other components. Service providers can utilize the systems and methods to offer the described capabilities as a service. The systems and methods may be particularly useful in the data protection market, e.g., for backup and recovery, replication, vaulting and media management. Other implementations may include use in primary storage.

The systems and methods described herein relate to managed storage medium and representation of data in a managed repository. This may include disks, tapes and any other form of storage medium that may become commercially viable over time. The invention is not limited to the use of disks or fixed media, but is also applicable to removable media. For example, a removable disk may be used as a target output device; it may be managed in a similar way to tape, both being removable media. One approach to design of a system which includes removable media such as tapes, is to have a disk operate as a store for those chunks or elements that are most referenced, and have the least referenced chunks moved onto tape media. This could be balanced by a management system that takes into consideration the newness of any chunk. Also, the system may move related repository chunks to tape as a whole set to be archived and restored from the archive as a set. This would multiply the advantages of the invention. For example, if 100 pieces of media were required to be used without the invention then for example 10 pieces of media may only be required after utilization of the invention. The media may comprise virtual media that describes itself as a repository.

Various embodiments of the synchronization algorithm and binary difference algorithm described herein have execution time that is linear in a size of the version and space that is constant (depending on the size of the chunk and the anchor set). The reuse of calculated values between the algorithms saves computing time.

The described embodiments also illustrate the use of two memory hierarchies. The synchronization algorithm computes and temporarily stores a set of representation (e.g., hash) values for the input data, from which a set of distinguishing characteristics is derived for identifying similar data regions in the repository, and which distinguishing characteristics are stored in an index once the input data is deposited in the repository. The representation values of the input data in temporary storage can then be used in the binary difference algorithm for identifying exact data matches with the repository data. The binary difference algorithm computes a set of representation (e.g., hash) values for the data regions of interest in the repository, and temporarily stores such values in memory, for comparison with the representation values of the input data. By processing corresponding intervals of the repository data and input data, a relatively small amount of memory can be used for storing representation values. Also, the matched data segments are produced in positional order of input data, which saves on sorting time and storage requirements.

Furthermore, the embodiments described herein of the synchronization algorithm and binary difference algorithm scale to a petabyte size repository. In various embodiments, the ratio of the repository size to the index size is up to 250,000:1, enabling a 4 GB index to represent 1 PB repository, and enabling this index to fit into the memory of commercially-available, commodity-type computers. Where a hash table is used as the index, searching the index is a constant time and constant space $O(1)$ operation, and makes the find process independent of the size of the repository, for repositories of up to 1 PB. If the repository is not limited to 1 PB, then a binary tree or B-tree can be used for the index. The size of the index is still smaller than the repository by a factor of 250,000:1, and searching the index is an operation that takes $O(\log(m/250,000))$, where m is the size of the repository. For a 1 PB repository, m is $2^{50}$, so $\log(m/250,000)$ is 32.

The systems and methods described herein can provide a data storage system that implements large-scale lossless data reduction of an input data with respect to a repository by partitioning the input data into parts that are in the repository and those that are not. The partitioning is done by a two-step process:

(1) for each chunk of input data, find all regions in the repository that contain data that is similar to it,
   where the find process also provides a rough estimate of the similarity, providing the ability to grade levels of similarity.
   Where the find process can be done using an index and memory even though the repository is very large,
   where the ratio of the repository size to index size can be up to 250:000:1, and
   where within each region found, the search finds one or more actual places that are corresponding, and (2) for all the regions found, choose the most similar region in the repository and binary difference it by
   reading that part of the repository into memory,
      comparing the input chunk to the part of the repository to find the exact changes while using the actual corresponding places as guide, the output of which is the partition identified above. The data in the input data that was found in the repository does not need to be stored again. The characteristics of the input data can be added to the index.

The embodiments of the binary difference algorithm described herein have a number of advantages. The matched distinguishing characteristics provided by the similarity search (of the index) form the frame of reference for the binary difference process, as well as the logical partitions within this frame (e.g., the anchors). The binary difference algorithm requires only one hash table, and this hash table is small, since it stores only one value for every seed of the repository data segment of interest. The representation values of the input data at every sub-seed step (e.g., byte) are known, since they were calculated during the index search. The incremental cost of the binary difference process is small, and it is linear in the size of the input data. Because the repository hash table is searched at every sub-seed interval (e.g., byte), the binary difference search finds misaligned data.

In various embodiments, the binary difference method can be used for performing a linear time and constant space $O(1)$ process for comparing the input data and the region of the repository that were identified to be similar. The process uses previously calculated results of the similarity search, and only one repository hash table that is smaller than the identified region in the repository by a factor of the seed size. The binary difference process finds identical data even if it has been swapped or misaligned. It finds all identical data that is at least seed size length, where the hash table is sufficiently large. The process elicits a list of sub-regions in the input data that were found, in the order of their appearance in the input data.

Other embodiments of the invention will be apparent to those skilled in the art from consideration of the specification and practice of the invention disclosed herein. It is intended that the specification and examples be considered as exemplary only, with the scope of the invention being indicated by the appended claims.

What is claimed is:

1. A method enabling lossless data reduction comprising:
   partitioning version data into:
   a) data corresponding to data already stored in a repository; and
   b) data not already stored in the repository;
   wherein the data already stored in the repository comprise a plurality of repository chunks, wherein the version data comprise a plurality of version chunks,
   the method further comprising:
   storing in an index a plurality of n repository distinguishing characteristics (RDCs) and a position in the repository of each of the plurality of repository chunks, where n is smaller than size m of the repository chunk, where m is a value representative of a number of bytes of the repository chunk; and
   for each version chunk:
   determining a plurality of k input distinguishing characteristics (IDCs) of the version chunk, where k is greater than or equal to n;
   determining whether a similar repository chunk exists based on a plurality of matching distinguishing characteristics in the version chunk and similar repository chunk, wherein the similarity determination includes searching for each of the k distinguishing characteristics of the version chunk in the index until at most n matches are found;
   determining that one or more similar repository chunks exist where the number of matches satisfies a threshold;
   determining differences between the version chunk and similar repository chunk by comparing full data of the respective chunks; and
   storing the differences in the repository.

2. The method of claim 1, wherein the determining differences step includes use of a method selected from the group consisting of binary difference and byte-wise factoring.

3. The method of claim 1, wherein the index includes a location in the repository of the distinguishing characteristics of the repository chunk.

4. The method of claim 1, where in the determining similar repository chunk step includes searching until at least two matching distinguishing characteristics are found for the version chunk and one or more repository chunks.

5. The method of claim 1, wherein the distinguishing characteristics are determined by a hash function.

6. The method of claim 5, wherein the distinguishing characteristics are determined by a rolling hash function.

7. The method of claim 6, wherein the distinguishing characteristics are determined by a modular hash function.

8. The method of claim 1, wherein the index is stored as a binary tree, a B tree, a sorted list, or a hash table.

9. The method of claim 8, wherein the index is stored as a hash table.

10. The method of claim 1, wherein pointers are provided to data of the version chunk already stored in the repository.

11. The method of claim 1, wherein the repository and version chunks each comprise a plurality of seeds, each seed being a consecutive sequence of base elements and having the same seed size s, and wherein the distinguishing characteristics are hash values of a selected subset of the seeds of the respective chunk.

12. The method of claim 11, wherein the seeds comprise overlapping seeds.

13. The method of claim 1, wherein the method is used for data factoring.

14. The method of claim 1, wherein the method is used for data backup.

15. The method of claim 1, wherein the method is used for data backup with a data repository of a size for storing up to one or more petabytes of data.

16. The method of claim 1, wherein the determining similar repository chunk step is conducted in a time independent of a size of the repository and linear in a size of the version data.

17. The method of claim 1, wherein a ratio of space needed to store the repository chunk to space needed to store the distinguishing characteristics of the repository chunk is up to 250,000: 1.

18. The method of claim 1, wherein the method includes modifying the index to include a selected n of the k distinguishing characteristics of the version chunk.

19. The method of claim 18, wherein the method includes modifying the repository to include the differences.

* * * * *